United States Patent
Oh et al.

(10) Patent No.: US 9,860,574 B2
(45) Date of Patent: Jan. 2, 2018

(54) METHOD AND APPARATUS FOR TRANSCEIVING BROADCAST SIGNAL

(71) Applicant: LG ELECTRONICS INC., Seoul (KR)

(72) Inventors: Hyunmook Oh, Seoul (KR); Jongyeul Suh, Seoul (KR); Soojin Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/117,010

(22) PCT Filed: Feb. 16, 2015

(86) PCT No.: PCT/KR2015/001542
§ 371 (c)(1),
(2) Date: Aug. 5, 2016

(87) PCT Pub. No.: WO2015/126117
PCT Pub. Date: Aug. 27, 2015

(65) Prior Publication Data
US 2017/0180767 A1    Jun. 22, 2017

Related U.S. Application Data

(60) Provisional application No. 61/943,455, filed on Feb. 23, 2014.

(51) Int. Cl.
*H04N 21/488* (2011.01)
*H04N 21/236* (2011.01)

(52) U.S. Cl.
CPC ... *H04N 21/23614* (2013.01); *H04N 21/4884* (2013.01)

(58) Field of Classification Search
CPC .................................................... H04N 21/488
See application file for complete search history.

(56) References Cited

U.S. PATENT DOCUMENTS

2011/0149153 A1   6/2011   Nam et al.
2011/0181773 A1*  7/2011   Ohashi ................. H04N 21/431
                                                        348/465
2013/0027514 A1   1/2013   Cho et al.
(Continued)

FOREIGN PATENT DOCUMENTS

KR    10-2011-0072181 A    6/2011
KR    10-2011-0115103 A    10/2011
(Continued)

*Primary Examiner* — Hunter B Lonsberry
(74) *Attorney, Agent, or Firm* — Birch, Stewart, Kolasch & Birch, LLP

(57) ABSTRACT

The present invention relates to an apparatus and a method for transceiving a broadcast signal including a subtitling service. One embodiment of the present invention provides a method for transmitting a broadcast signal, comprising the steps of: encoding video data to generate a video stream; generating a broadcast signal including the generated video stream and a subtitle stream; and transmitting the generated broadcast signal. According to the embodiment of the present invention, a transmission stream which provides a digital broadcast subtitling service using an XML subtitle can be transmitted.

14 Claims, 21 Drawing Sheets

(56) References Cited

U.S. PATENT DOCUMENTS

| | | | |
|---|---|---|---|
| 2013/0110977 | A1 | 5/2013 | Hong et al. |
| 2014/0078248 | A1* | 3/2014 | Tsukagoshi ........ H04N 13/0022 348/43 |
| 2014/0310762 | A1 | 10/2014 | Dewa |
| 2015/0304730 | A1* | 10/2015 | Yamagishi ........... H04N 21/235 725/137 |

FOREIGN PATENT DOCUMENTS

| | | |
|---|---|---|
| WO | WO 2011/132879 A2 | 10/2011 |
| WO | WO 2012169813 A2 | 12/2012 |
| WO | WO 2013/088986 A1 | 4/2015 |

* cited by examiner

FIG. 6

| Syntax | No. of bits | Mnemonic |
|---|---|---|
| transport_packet(){ | | |
|     sync_byte | 8 | bslbf |
|     transport_error_indicator | 1 | bslbf |
|     payload_unit_start_indicator | 1 | bslbf |
|     transport_priority | 1 | bslbf |
|     PID | 13 | uimsbf |
|     transport_scrambling_control | 2 | bslbf |
|     adaptation_field_control | 2 | bslbf |
|     contiunity_counter | 4 | uimsbf |
|     if(adaptation_field_control= ='10'\|\|adaptation_field_control= ='1 1'){ | | |
|         adaption_field() | | |
|     } | | |
|     if(adaptation_field_control= ='01'\|\|adaptation_field_control= ='1 1'){ | | |
|         for (i=0;i<N;i++){ | | |
|             data_byte | 8 | bslbf |
|         } | | |
|     } | | |
| } | | |

FIG. 7

| Syntax | No. of bits | Mnemonic |
|---|---|---|
| adaptation_field(){ | | |
|     adaptation_field_length | 8 | uimsbf |
|     if(adaptation_field_length>0){ | | |
|         if(adaptation_field_length>0){ | | |
|             discountinuity_indicator | 1 | bslbf |
|             random_access_indicator | 1 | bslbf |
|             elementary_stream_priority_indicator | 1 | bslbf |
|             PCR_flag | 1 | bslbf |
|             OPCR_flag | 1 | bslbf |
|             splicing_point_flag | 1 | bslbf |
|             transport_private_data_flag | 1 | bslbf |
|             adaptation_field_extension_flag | | |
|             if(PCR_flag=='1'){ | | |
|                 program_clock_reference_base | 33 | uimsbf |
|                 reserved | 6 | bslbf |
|                 program_clock_reference_extension | 9 | uimsbf |
|             } | | |
|             if(OPCR_flag=='1'){ | | |
|                 original_program_clock_reference_base | 33 | uimsbf |
|                 reserved | 6 | bslbf |
|                 original_program_clock_reference_extension | 9 | uimsbf |
|             } | | |
|             if(splicing_point_flag=='1'){ | | |
|                 splice_countdown | 8 | tcimsbf |
|             } | | |
|             if(transport_private_data_flag=='1'){ | | |
|                 transport_private_data_length | 8 | uimsbf |
|                 for(i=0;i<transport_private_data_length:i++){ | | |
|                     private_data_byte | 8 | bslbf |
|                 } | | |
|             } | | |
|             if(adaptation_field_extension_flag=='1'){ | | |
|                 adaptation_field_extension_length | 8 | uimsbf |
|                 ltw-flag | 1 | bslbf |
|                 piecewise-rate-flag | 1 | bslbf |
|                 seamless_splice_flag | 1 | bslbf |
|                 reserved | 5 | bslbf |
|                 if(ltw_flag=='1'){ | | |
|                     ltw_valid_flag | 1 | bslbf |
|                     ltw_offset | 15 | uimsbf |
|                 } | | |
|                 if(piecewise_rate_flag=='1'){ | | |
|                     reserved | 2 | bslbf |
|                     piecswise_rate | 22 | uimsbf |
|                 } | | |
|                 if(seamless_splice_flag=='1'){ | | |
|                     splice_type | 4 | bslbf |
|                     DTS_next_AU[32..30] | 3 | bslbf |
|                     marker_bit | 1 | bslbf |
|                     DTS_next_AU[29..15] | 15 | bslbf |
|                     marker_bit | 1 | bslbf |
|                     DTS_next_AU[14..0] | 15 | bslbf |
|                     marker_bit | 1 | bslbf |
|                 } | | |
|                 for(i=0;i<N;i++){ | | |
|                     reserved | 8 | bslbf |
|                 } | | |
|             } | | |
|             for(i=0;i<N:i++){ | | |
|                 stuffing_byte | 8 | bslbf |
|             } | | |
|     } | | |
| } | | |

FIG. 8

| Syntax | No. of bits | Mnemonic |
|---|---|---|
| PES_packet(){ | | |
|   packet_start_code_prefix | 24 | bslbf |
|   stream_id | 8 | uimsbf |
|   PES_packet_length | 16 | uimsbf |
|   if(stream_id !=program_stream_map | | |
|   && stream_id !=padding_stream | | |
|   && stream_id !=private_stream_2 | | |
|   && stream_id !=ECM | | |
|   && stream_id !=EMM | | |
|   && stream_id !=program_stream_directory | | |
|   && stream_id !=DSMCC_stream | | |
|   && stream_id !=ITU-T Rec.H.222.1type E stream){ | | |
|     '10' | | |
|     PES_scrambling_control | 2 | bslbf |
|     PES_priority | 2 | bslbf |
|     data_alignment_indicator | 1 | bslbf |
|     copyright | 1 | bslbf |
|     original_or_copy | 1 | bslbf |
|     PTS_DTS_flags | 1 | bslbf |
|     ESCR_flag | 2 | bslbf |
|     ES_rate_flag | 1 | bslbf |
|     DSM_trick_mode_flag | 1 | bslbf |
|     additional_copy_info_flag | 1 | bslbf |
|     PES_CRS_flag | 1 | bslbf |
|     PES_extension_flag | 1 | bslbf |
|     PES_header_data_length | 1 | bslbf |
|     if(PTS_DTS_flags=='10'){ | 8 | uimsbf |
|       '0010' | 4 | bslbf |
|       PTS [32...30] | 3 | bslbf |
|       marker_bit | 1 | bslbf |
|       PTS [29...15] | 15 | bslbf |
|       marker_bit | 1 | bslbf |
|       PTS [14...0] | 15 | bslbf |
|       marker_bit | 1 | bslbf |
|     } | | |
|     if(PTS_DTS_flags=='11'){ | | |
|       '0011' | 4 | bslbf |
|       PTS [32...30] | 3 | bslbf |
|       marker_bit | 1 | bslbf |
|       PTS [29...15] | 15 | bslbf |
|     if(PES_extension_flag=='1'){ | | |
|       PES_private_data_flag | 1 | bslbf |
|       pack_header_field_flag | 1 | bslbf |
|       program_packet_sequence_counter_flag | 1 | bslbf |
|       P-STD_buffer_flag | 1 | bslbf |
|       reserved | 3 | bslbf |
|       PES_extension_flag_2 | 1 | bslbf |
|       if(PES_private_data_flag=='1'){ | | |
|         PES_private_data | 128 | bslbf |
|       } | | |
|       if(pack_header_field_flag=='1'){ | | |
|         pack_field_length | 8 | uimsbf |
|         pack_header() | | |
|       } | | |
|       if(program_packet_sequence_counter_flag=='1'){ | | |
|         market_bit | 1 | bslbf |
|     for(o=0;i<PES extension field length;io++) { | | |
|       reserved | 8 | Bslbf |
|     } | | |
|   } | | |
|   } | | |
|   for(i<0;i<N1;io++){ | | |
|     stuffing_byte | 8 | bslbf |
|   } | | |
|   for(i<0;i<N2;io++){ | | |
|     PES_packet_data_byte | 8 | bslbf |
|   } | | |
| } | | |
| else if (stream_id= =program_stream_map | | |
| ||stream_id= =private_stream_2 | | |
| ||stream_id= =ECM | | |
| ||stream_id= =EMM | | |
| ||stream_id= =program_stream_directory | | |
| ||stream_id= =DSMCC_stream | | |
| ||stream_id= =ITU-T Rec.H.222.1 type E stream) { | | |
|   for (i=0;i<PES_packet_length;i++) { | | |
|     PES_packet_data_byte | 8 | bslbf |
|   } | | |
| } | | |
| else if (stream_id= =padding_stream) { | | |
|   for(i<0;i<PES_packet_length;io++) { | | |
|     padding_byte | 8 | bslbf |
|   } | | |
| } | | |
| } | | |

FIG. 9

|  | No. Of bits | Format |
|---|---|---|
| PES_data_field() { | | |
|     data_identifier | 8 | bslbf |
|     subtitle_stream_id | 4 | bslbf |
|     subtitle_division_type | 4 | bslbf |
|     system_clock_frequency | ? | bslbf |
|     while next bits () == '0000 1111' { | | |
|         XML_subtitle_segment () | | |
|     } | | |
|     end_of_PES_data_field_marker | 8 | bslbf |
| } | | |

| subtitle_stream_id | XML subtitle type |
|---|---|
| 0000 | Reserved |
| 0001 | TTML |
| 0010 | SMPTE-TT |
| 0011 | EBU-TT-D |
| 0100 | EBU-TT |
| 0101 | CFF-TT |
| 0110 | Youview |
| 0111-1000 | User private |
| 1001-1111 | Reserved for future use |

| subtitle_division_type | Description |
|---|---|
| 0000 | Reserved |
| 0001 | Division of mean unit of sentences |
| 0010 | Division according to scenes |
| 0011 | Division according to rap |
| 0100 | Division according to speaker |
| 0101 | Division according to sentences |
| 0110-1111 | Reserved for future use |

FIG. 10

|  | No. Of bits | Format |
|---|---|---|
| XML_tt_segment() {<br>    sync_byte<br>    segment_type<br>    reserved<br>    version_number<br>    data_coding_type<br>    segment_length<br>    while (current_length < segment_length) {<br>        tt_data_code<br>    }<br>} | <br>8<br>4<br>4<br>8<br>8<br>16 | <br>bslbf<br>bslbf<br>bslbf<br>bslbf<br>bslbf<br>uimsbf |

| segment_type | Meaning | Main content (example of ebu-tt-d) |
|---|---|---|
| 0000 | Reserved | |
| 0001 | <tt:tt> | <tt:head> <tt:body> |
| 0010 | <tt:head> | <tt:styling>, <tt:layout>, <tt:style>, <tt:region>, <ttm:metadata>, <ttm:copyright> etc |
| 0011 | <tt:body> | <tt:div>, <tt:p>, <tt:span>, <tt:br>, <tt:metadata> etc |
| 0100-1000 | User private | |
| 1001-1111 | Reserved for future use | |

FIG. 11

|  | No. Of bits | Format |
|---|---|---|
| XML_head_segment() { | | |
|     sync_byte | 8 | bslbf |
|     segment_type | 4 | bslbf |
|     head_update_type | 4 | bslbf |
|     version_number | 8 | bslbf |
|     data_coding_type | 8 | bslbf |
|     segment_length | 16 | uimsbf |
|     while (current_length < segment_length) { | | |
|         head_data_code | | |
|     } | | |
| } | | |

| head_update_type | Meaning | Detailed meaning |
|---|---|---|
| 0000 | Reserved | |
| 0001 | Update | When currently transmitted head information is information added to previous head information |
| 0010 | Refresh | When it is possible to process xml subtitle for next predetermined period using currently transmitted information |
| 0011 | New | When previous head information is discarded and currently transmitted information is transmitted |
| 0100-1000 | User private | |
| 1001-1111 | Reserved for future use | |

FIG. 12

|  | No. Of bits | Format |
|---|---|---|
| XML_body_segment() { | | |
|     sync_byte | 8 | bslbf |
|     segment_type | 4 | bslbf |
|     content_type | 4 | bslbf |
|     version_number | 8 | bslbf |
|     data_coding_type | 8 | bslbf |
|     segment_length | 16 | uimsbf |
|     while (current_length < segment_length) { | | |
|         body_data_code | | |
|     } | | |
| } | | |

| content_type | Meaning | Detailed meaning |
|---|---|---|
| 0000 | Reserved | |
| 0001 | Line update | When subtitles are separated and transmitted according to begin time (line update in same the page) |
| 0010 | Page update | When subtitles are grouped and transmitted in mean unit (update in page unit) |
| 0011-1000 | User private | |
| 1001-1111 | Reserved for future use | |

FIG. 13

| Syntax | Number of bits | Identifier |
|---|---|---|
| service_description_section(){ | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   transport_stream_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   original_network_id | 16 | uimsbf |
|   reserved_future_use | 8 | bslbf |
|   for (i=0;i<N;i++){ | | |
|     service_id | 16 | uimsbf |
|     reserved_future_use | 6 | bslbf |
|     ETT_schedule_flag | 1 | bslbf |
|     ETT_present_following_flag | 1 | bslbf |
|     running_status | 3 | uimsbf |
|     free_CA_mode | 1 | bslbf |
|     descriptors_loop_length | 12 | uimsbf |
|     for (j=0;j<N;j ++){ | | |
|       desriptor () | | |
|     } | | |
|   } | | |
|   CRC_32 | 32 | rpchof |
| } | | |

FIG. 14

| Syntax | Number of bits | Identifier |
|---|---|---|
| component_descriptor(){ | | |
|     descriptor_tag | 8 | uimsbf |
|     descriptor_length | 8 | uimsbf |
|     reserved_future_use | 4 | bslbf |
|     sream_content | 4 | uimsbf |
|     component_type | 8 | uimsbf |
|     component_tag | 8 | uimsbf |
|     ISO_639_language_code | 24 | bslbf |
|     for (i=0;i<N;i++){ | | |
|         text_char | 8 | uimsbf |
|     } | | |
| } | | |

FIG. 15

| Syntax | Number of bits | Identifier |
|---|---|---|
| TS_program_map_section(){ | | |
|     table_id | 8 | uimsbf |
|     secyion_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for (i=0;i<N;i++){ | | |
|         descriptor() | | |
|     } | | |
|     for (i=0;i<N1;i++){ | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for (i=0;i<N2;i++){ | | |
|             descriptor() | | |
|         } | | |
|     } | | |
|     CRC_32 | 32 | rpchof |
| } | | |

FIG. 16

| Syntax | Number of bits | Identifier |
|---|---|---|
| subtitling_descriptor(){ | | |
|    descriptor_tag | 8 | uimsbf |
|    descriptor_length | 8 | uimsbf |
|    for (i=0;i<N;i++){ | | |
|      ISO_639_language_code | 24 | bslbf |
|      subitling_type | 8 | bslbf |
|      composition_page_id | 16 | bslbf |
|      ancillary_page_id | 16 | bslbf |
|    } | | |
| } | | |

METHOD AND APPARATUS FOR TRANSCEIVING BROADCAST SIGNAL

CROSS REFERENCE TO RELATED APPLICATIONS

This application is the National Phase of PCT International Application No. PCT/KR2015/001542, filed on Feb. 16, 2015, which claims priority under 35 U.S.C. 119(e) to U.S. Provisional Application No. 61/943,455, filed on Feb. 23, 2014, all of which are hereby expressly incorporated by reference into the present application.

TECHNICAL FIELD

The present invention relates to a method and apparatus for transmitting and receiving a broadcast signal.

BACKGROUND ART

By virtue of the development of digital technologies and communication technologies, propagation and demand for audio/video centered multimedia content have remarkably expanded in various fields such as the Internet and personal media as well as broadcast and movie. In addition, consumer demand for immersive media for providing a three-dimensional effect through broadcasting and movies has increased. Along with propagation of a big TV screen at home in accordance with current trends as well as the development of display technologies, consumption for enjoying realistic contents with high image quality of high definition (HD) level or more. Immersive broadcast such as ultra high definition TV (UHDTV) as well as 3DTV has drawn attention as a next-generation broadcast service and, in particular, ultra high definition (UHD) broadcast services have been gradually discussed in accordance with current trends.

Currently, a broadcast subtitle service has been provided in the form of closed caption or digital video broadcasting (DVB) subtitle. Among these, in the case of DVB subtitle, a subtitle is provided in the form of a bitmap image and, thus, subtitles with different sizes are provided with respect to images with various sizes or a service needs to be provided by scaling a single type of subtitle. In the former case, efficiency may be lowered in terms of bandwidth and, in the latter case, sharpness may be lowered via scaling. In particular, recently, as a high resolution of broadcast service via UHDTV has been actively discussed, there is a need for a new broadcast subtitle service in order to overcome this problem.

DISCLOSURE

Technical Problem

An object of the present invention devised to solve the problem lies in a method and apparatus for transmitting a broadcast signal, for enhancing transmission efficiency.

Another object of the present invention devised to solve the problem lies in a transmission method and apparatus for providing a subtitle service in a broadcast network.

Another object of the present invention devised to solve the problem lies in a method and apparatus for synchronizing a subtitle service with a video audio stream.

Technical Solution

The object of the present invention can be achieved by providing a method of transmitting a broadcast signal, the method including encoding video data to generate a video stream, generating a broadcast signal including the generated video stream and a subtitle stream, and transmitting the generated broadcast signal.

The subtitle stream may include XML subtitle data.

Head and body elements for configuration of the XML subtitle data may be transmitted in one subtitle stream.

Head and body elements for configuration of the XML subtitle data may be separated and transmitted in respective separate subtitle streams.

The XML subtitle data may be divided and transmitted in each respective subtitle stream according to presentation time of a subtitle.

A type of the XML subtitle data may be one of TTML, SMPTE-TT, EBU-TT-D, EBU-TT, Common File Format & Media Formats time text (CFF-TT), and YouView.

The video stream and the subtitle stream may be synchronized based on a PTS.

The XML subtitle data may be transmitted by a first subtitle stream and a second subtitle stream; and when first XML subtitle data included in the first subtitle stream and second XML subtitle data included in the second subtitle stream contain partially overlapping data, the second subtitle stream may include only the remaining part except for the partially overlapping data from the second XML subtitle data.

In another aspect of the present invention, provided herein is a broadcast signal transmitter including an encoder configured to encode video data to generate a video stream, a multiplexer configured to multiplex the generated video stream and a subtitle stream to generate a broadcast signal, and a transmitter configured to the generated broadcast signal.

In another aspect of the present invention, provided herein is a method receiving a broadcast signal, the method including receiving a broadcast signal, demultiplexing the received broadcast signal into a video stream and a subtitle stream, and decoding each of the video stream and the subtitle stream.

In another aspect of the present invention, provided herein is a broadcast signal receiver including a receiver configured to receive a broadcast signal, a demultiplexer configured to demultiplex the received broadcast signal into a video stream and a subtitle stream, and a decoder configured to decode each of the video stream and the subtitle stream.

Advantageous Effects

According to an embodiment of the present invention, transmission efficiency of a broadcast system may be enhanced.

According to an embodiment of the present invention, a subtitle service may be provided in a broadcast network.

According to an embodiment of the present invention, a broadcast receiving apparatus may extract and display a subtitle included in a broadcast signal.

DESCRIPTION OF DRAWINGS

FIG. 6 is a diagram illustrating a configuration of transport packet according to an embodiment of the present invention.

FIG. 7 is a diagram illustrating a configuration of an adaptation field according to an embodiment of the present invention.

FIG. 8 is a diagram illustrating a configuration of PES_packet according to an embodiment of the present invention.

FIG. 9 is a diagram illustrating a PES_data_field according to an embodiment of the present invention.

FIG. 10 is a diagram illustrating a configuration of XML_tt_segment according to an embodiment of the present invention.

FIG. 11 is a diagram illustrating a configuration of XML_head_segment according to an embodiment of the present invention.

FIG. 12 is a diagram illustrating a configuration of XML_body_segment according to an embodiment of the present invention.

FIG. 13 is a diagram illustrating a method of applying an XML subtitle to a DVB subtitle service according to an embodiment of the present invention.

FIG. 14 is a diagram illustrating a configuration of a component_descriptor according to an embodiment of the present invention.

FIG. 15 is a diagram illustrating a method of applying an XML subtitle to a DVB subtitle service according to an embodiment of the present invention.

FIG. 16 is a diagram illustrating a configuration of subtitling_descriptor according to an embodiment of the present invention.

BEST MODE

Figure 1:
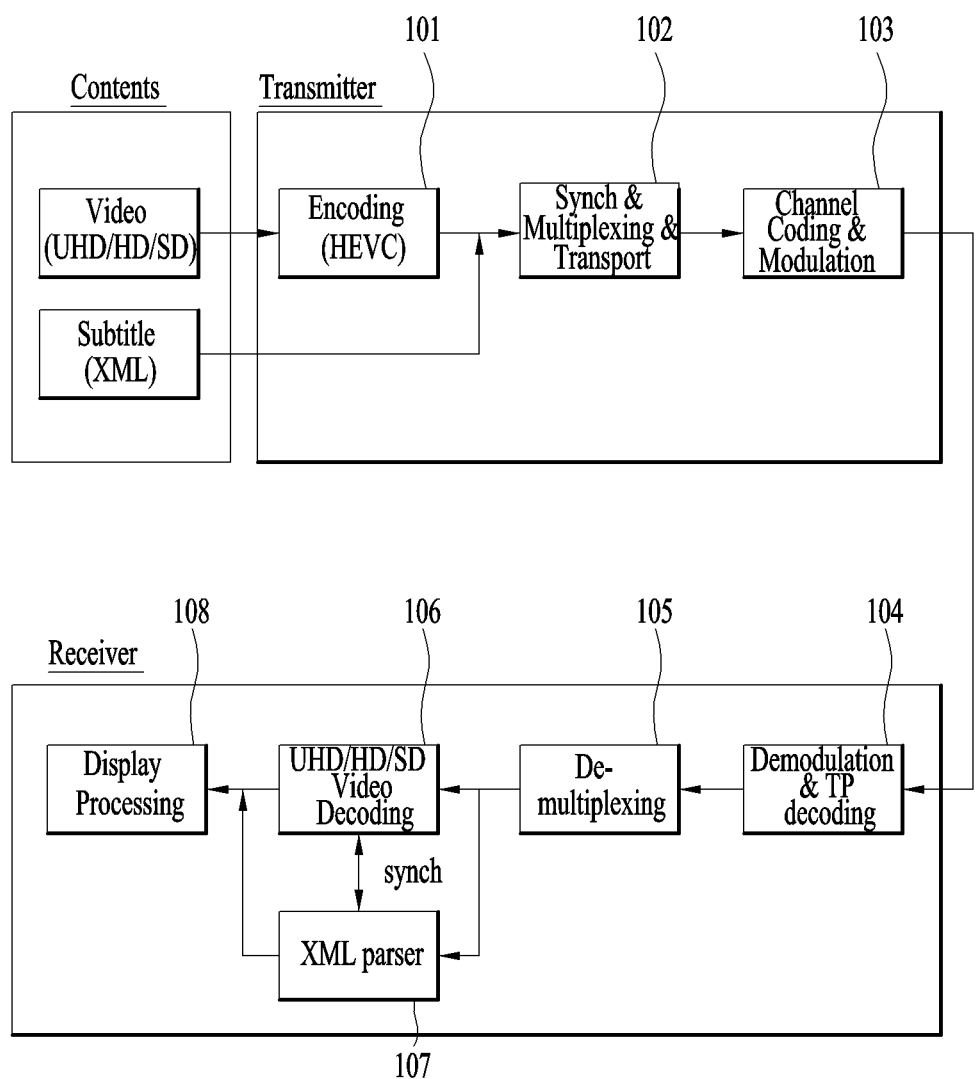
FIG. 1 is a diagram illustrating an XML-based broadcast subtitle service according to an embodiment of the present invention.

As a broadcast service provided through an Internet protocol (IP) has begun to be provided as a next-generation broadcast service, a new subtitle service standard has been established to replace typical broadcast subtitles. In future, a broadcast service is expected to be provided in the form of fusion of existing broadcast and IP and, in this case, it is not effective to separately serve subtitles formed with different standards.

Examples of the IP broadcast subtitles service standard may include the XML-based established time text markup language (TTML), Society of Motion Picture and Television Engineers Timed Text (SMPTE-TT), and European Broadcasting Union time text (EBU-TT-D). These may be appropriate for Dynamic Adaptive Streaming over HTTP (DASH)-based services that need to support various resolutions in that a subtitle dependent upon a size of an image can be served. There has been an attempt to use an XML subtitle in a UHD broadcast service using this advantage and, thus, there is a need for a method of transmitting an XML subtitle established to be appropriate for media and IP streaming according to an existing broadcast service.

Recently, standards of XML language-based subtitles such as time text markup language (TTML) and EBU time text (EBU-TT) have been established. The standards are used for a subtitle service in media and IP streaming environments but the standard group has had requirements to also use the standards in a broadcast service. There are for using the advantage of adaptively using the standards in various service environments (e.g., HD and UHD) based on the same subtitle source as well as the advantage of using an integrated subtitle source in various broadcast environments.

To aid in understanding and for convenience of description of the present invention, terms and abbreviations are defined as follows.

High Efficiency Video Coding (HEVC) may refer to a high-efficiency video coding standard for providing the same video quality while having about double the compressibility of existing H.265/AVC technologies.

Extensible Markup Language (XML) may be a language formed by enhancing HTML, may enhance a function of constructing a homepage, a search function, and so on, and may easily process complex data of a client system. In the present invention, XML may be used as a language for constituting subtitle data and an XML subtitle may include a head and a body.

Presentation Time Stamp (PTS) may refer to a value indicated a time point in which a decoded access unit is reproduced. In the present invention, the PTS may be used to synchronize a video ES and a subtitle ES.

Elementary Stream (ES) may refer to output of a data encoder. That is, output of a video encoder and an audio encoder may be defined as a video ES and an audio ES, respectively. In the present invention, an XML subtitle ES may be defined and used.

A Packetized Elementary Stream (PES) may be formed by packetizing ES and may refer to a stream of packets with a header.

A Transport Stream (TS) may refer to a stream for transport including one or more programs and may be used in transport media with transport errors. In the present invention, TS may refer to a transport stream formed by multiplexing and transmitting at least two of a video ES, audio ES, and subtitle ES.

FIG. 1 is a diagram illustrating an XML-based broadcast subtitle service according to an embodiment of the present invention. FIG. 1 is a diagram illustrating a transmitter, a receiver, and an end-to-end system for a digital broadcast service. An XML-based subtitle used in the present invention is not affected by a size of an image and, thus may be applied to all of UHD/HD/SD.

The transmitter may transmit a compressed image and an XML subtitle modified for transmission through a multiplexer and, in this case, user presentation time stamp (PTS) information for synchronization between two data items is used. In FIG. 1, the transmitter may receive video data and subtitle information. Resolution of the video data input to the transmitter may be UHD, HD, or SD. In addition, the subtitle information input to the transmitter may be written in XML. The video data input to the transmitter may be encoded by the transmitter (101). The transmitter may use High Efficiency Video Coding (HEVC) as an encoding method of video data. The transmitter may synchronize and multiplex the encoded video data and XML subtitle (102). Here, the XML subtitle may be modified for transmission. That is, the XML subtitle may be modified into an XML subtitle ES and an XML subtitle PES for transmission. As described above, the encoded video data and XML subtitle may be synchronized using the PTS information. The transmitter may perform channel coding and modulation on the synchronized and multiplexed data and then transmit the data as a broadcast signal. The transmitter will be described in detail with reference to FIGS. 2 to 17.

The receiver may perform demultiplexing and video decoding on a subtitle and provide the subtitle through an XML parser and, in this case, synchronize between the video data and the subtitle based on the PTS. The receiver may demodulate the received broadcast signal and perform transport packet (TP) decoding on the broadcast signal (104). The decoded transport packet may be demultiplexed 105 and then input to a video decoder 106 and an XML parser 107. Here, the video decoder 106 may decode UHD, HD, or SD video data according to resolution of the received video data. The XML parser 107 may extract the XML subtitle. During this procedure, the receiver may synchronize the video data and the XML subtitle based on the PTS. The decoded video data and XML subtitle may be processed by a display processor 108 and then displayed. The receiver will be described in detail with reference to FIGS. 18 to 21.

Figure 2:
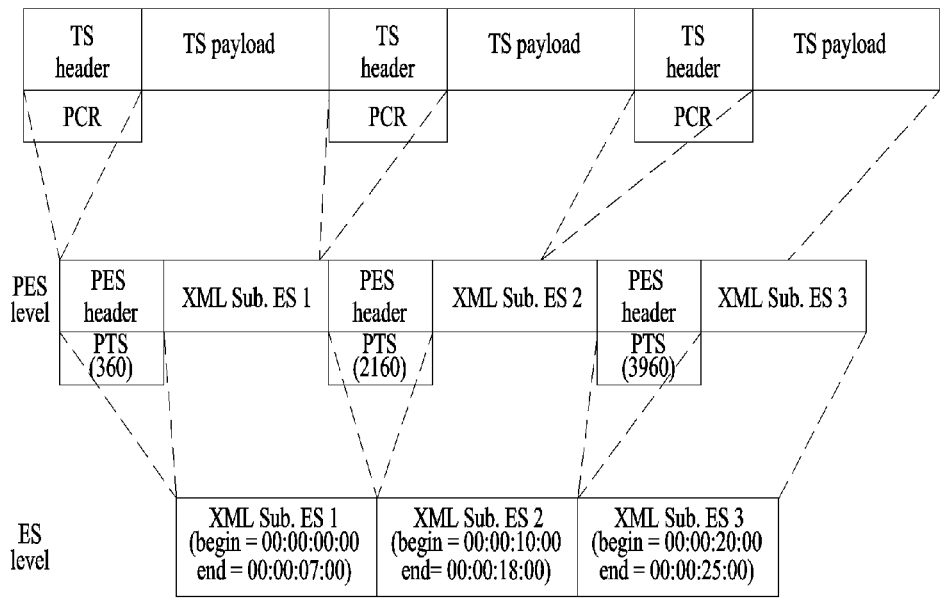
FIG. 2 is a diagram illustrating a basic concept for transmitting an XML subtitle in a broadcast signal according to an embodiment of the present invention.
Figure 3:
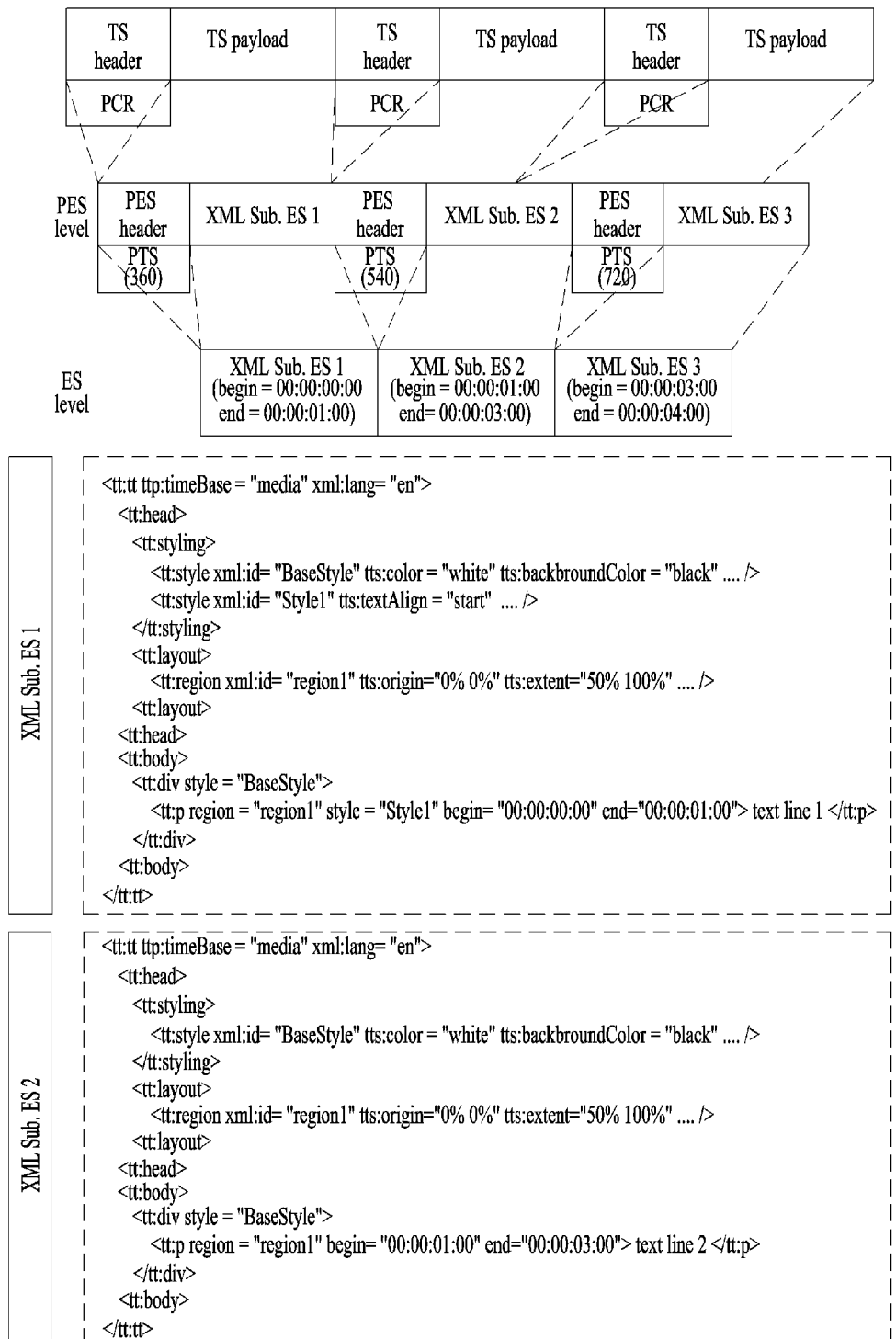
FIG. 3 is a diagram illustrating a method of transmitting an XML broadcast subtitle according to another embodiment of the present invention.
Figure 4:
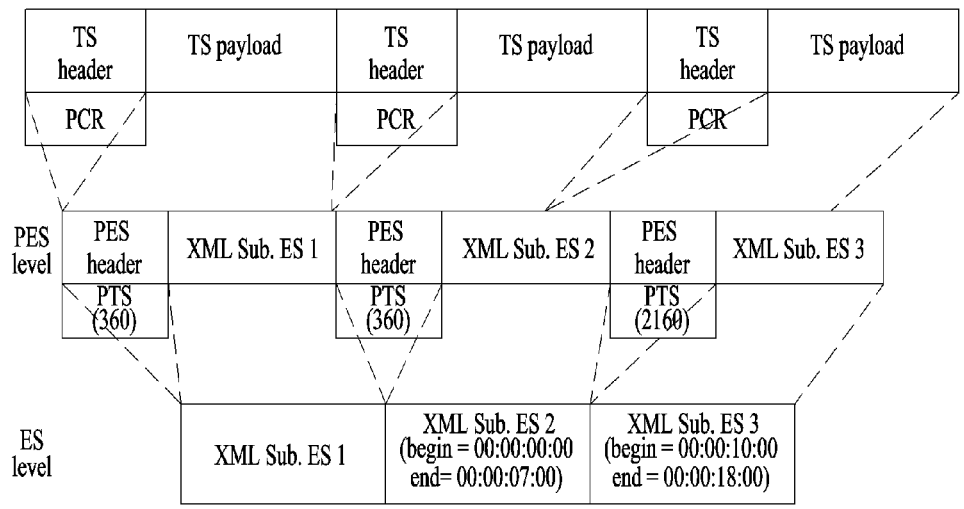
FIG. 4 is a diagram of a method of separating a head and a body included in an XML subtitle to different ESs and transmitting the XML subtitle according to an embodiment of the present invention.
Figure 5:
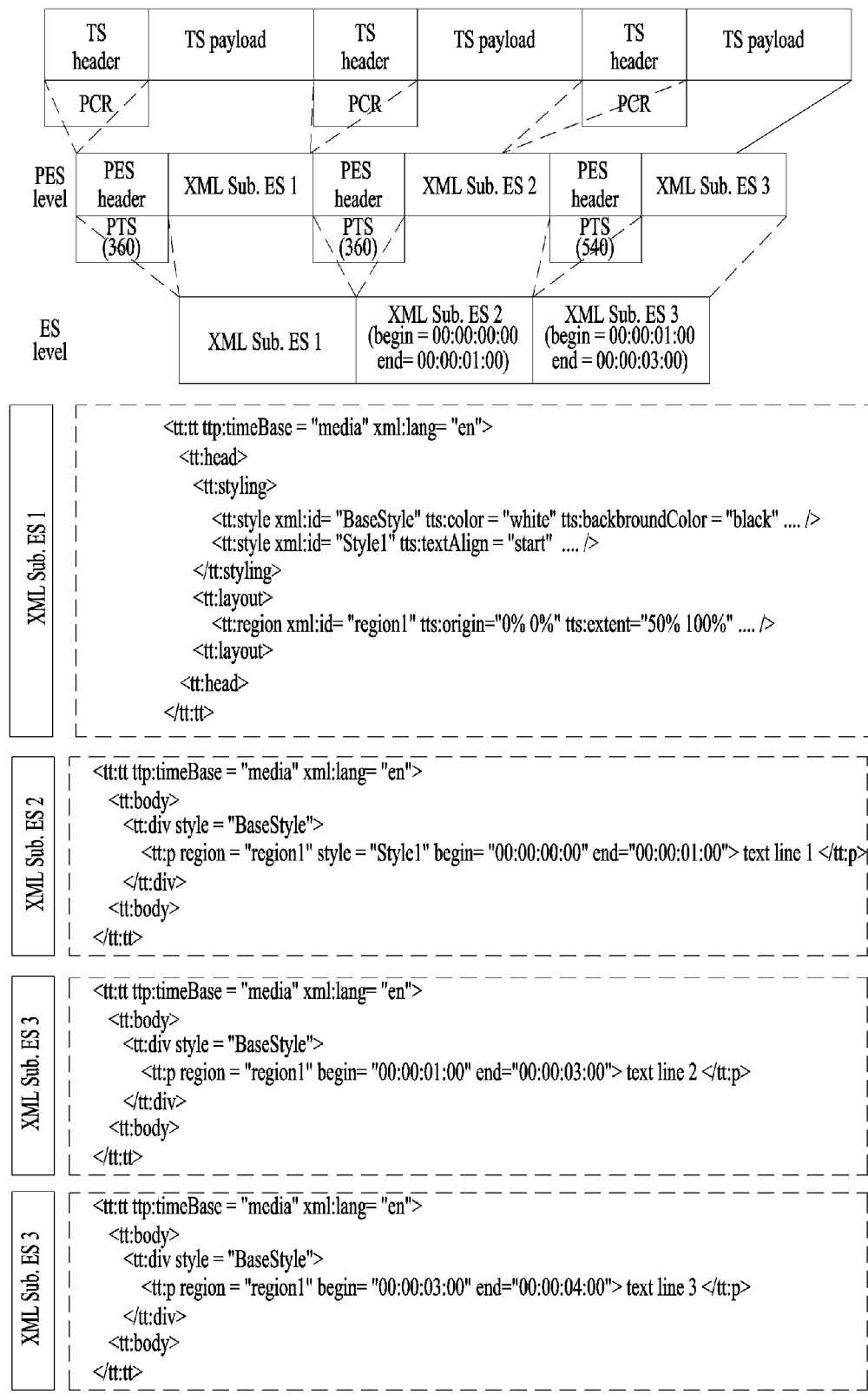
FIG. 5 is a method of separating a head and a body included in an XML subtitle into different ESs and transmitting the ESs according to another embodiment of the present invention.

A method of transmitting an XML subtitle in an MPEG2-TS by a transmitter may include two methods of scenario 1 and scenario 2. Scenario 1 is a method of configuring an ES with all information items for subtitle configuration and scenario 2 is a method of separating overlapping information of subtitle information and transmitting the subtitle information. FIGS. 2 and 3 illustrate a subtitle transmission method based on scenario 1 and FIGS. 4 and 5 illustrates a subtitle transmission method based on scenario 2.

FIG. 2 is a diagram illustrating a basic concept for transmitting an XML subtitle in a broadcast signal according to an embodiment of the present invention. An upper part of FIG. 2 is a diagram for explanation of a procedure of converting XML subtitle data into a stream. The subtitle data may be converted into an XML subtitle ES at an ES level. The XML subtitle ES may include begin and end time information of the ES. In addition, the XML subtitle ES may include subtitle data included at the corresponding begin and end time. For example, an XML subtitle ES1 may include subtitle information between begin time 00:00:00:00 and end time 00:00:07:00, an XML subtitle ES2 may include subtitle information between begin time 00:00:10:00 and end time 00:00:18:00, and an XML subtitle ES3 may include subtitle information between begin time 00:00:20:00 and end time 00:00:25:00.

Each ES may be converted into a PES at a PES level. The PES may be formed by packetizing an ES and each ES may be packetized together with a PES header. Here, the PES header may include PTS information. In FIG. 2, the XML subtitle ES1 may have PTS 360, the XML subtitle ES2 may have PTS 2160, and the XML subtitle ES3 may have PTS 3960. Each PES may be converted into a TS via a multiplexing procedure and the TS may include a TS header and a TS payload. The TS header may include PCR information. The PTS information and the PCR information may be used for synchronization between a subtitle and video, and a subtitle and video having the same PTS information may be synchronized with each other and may be displayed. The TS payload may include a subtitle PES described in the present invention.

A lower part of FIG. 2 illustrates detailed information included in the XML subtitle ES1. Each XML subtitle ES may be started by <tt:tt> and may include a head and a body as an element. <tt:tt ttp:timeBase="media" xml:lang="en"> may indicate that a time base is media time and a language is English. <tt:head> may indicate start of a head of subtitle information and <tt:styling> may indicate that styling information in the head is started. <tt:style xml:id="BaseStyle" tts:color="white" tts:backbroundColor="black" . . . /> may indicate that a style ID is a base style and the base style defines subtitle color as white and background color as black. <tt:style xml:id="Style1" tts:textAlign="start" . . . /> may indicate that a style Id is style1 and texts of the subtitle are aligned according to a start coordinate in style1. </tt:styling> may indicate that listing of the styling information is ended. <tt:layout> may indicate that layout information of the subtitle is started and <tt:region xml:id="region1" tts:origin="0% 0%" tts:extent="50% 100%" . . . /> may define a region 1 for displaying the subtitle and set a start point and size of the region 1. </tt:layout> may indicate that listing of the layout information is ended. </tt:head> may indicate that the head is ended and <tt:body> may indicate that the body is started. <tt:div style="BaseStyle"> included in the body may indicate that a subtitle of a corresponding division included in the body is a base style defined in the head. <tt:p region="region1" style="Style1" begin="00:00:00:00" end="00:00:01:00"> text line 1 </tt:p> may indicate that a text line 1 between begin time 00:00:00:00 and end time 00:00:01:00 is displayed in the region 1 defined in the head according to style1. <tt:p region="region1" begin="00:00:01:00" end="00:00:03:00"> text line 2 </tt:p> may indicate that a text line 2 between begin time 00:00:01:00 and end time 00:00:03:00 is displayed in the region 1 defined in the head. <tt:p region="region1" begin="00:00:03:00" end="00:00:04:00"> text line 3 </tt:p> may indicate that a text line 3 between begin time 00:00:03:00 and end time 00:00:04:00 is displayed in the region 1 defined in the head. <tt:p region="region1" begin="00:00:05:00" end="00:00:07:00"> text line 4 </tt:p> may indicate that a text line 4 between begin time 00:00:05:00 and end time 00:00:07:00 is displayed in the region 1 defined in the head. </tt:div>, </tt:body>, and </tt:tt> may indicate that listing of information on a division, the body, and the subtitle is ended.

In FIG. 2, the XML subtitle is schematically illustrated based on EBU-TT-D. <tt:tt> may include <tt:head> and <tt:body>. In the EBU-TT-D subtitle, information for image configuration may be positioned in <tt:head> and subtitle data and time information may be positioned in <tt:body>. Thereamong, the time information may be indicated by begin and end in <tt:div>. Generally, the XML subtitle aimed at media may be configured with one <tt:head> and one <tt:body>. However, according to the present invention, basically, one XML subtitle may be divided into unit elements appropriate for a broadcast service and may be transmitted. Here, the unit element may be a time unit, a body size unit, or a div unit.

As described above, FIG. 2 illustrates a method of configuring an elementary stream (ES) with all information items for subtitle configuration according to scenario 1. When a transmitter transmits a subtitle, all elements between begin time and end time of a subtitle for one program may be transmitted in one <tt:tt> but, in this case, it may be difficult to appropriately handle a situation such as transmission error or channel change. Accordingly, the transmitter may separate the subtitle according to time and transmit the subtitle. As a first method of separating the subtitle according to time, <tt:tt> may be configured and transmitted with respect to unit time as illustrated in FIG. 2. Each <tt:tt> configured with respect to unit time may include all information items for subtitle configuration. That is, each <tt:tt> includes all of image configuration, time, and subtitle information for a subtitle service with respect to a predetermined period or unit time and, thus, additional information is not necessary. In this case, video and audio synchronization is performed based on a PTS and, thus, according to the present invention, PTS information in a PES header may also be used and Program Clock Reference (PCR) as reference time may be provided through the TS header as a method of using the PTS. In this case, the PTS may be synchronized with time for first displaying a subtitle.

FIG. 3 is a diagram illustrating a method of transmitting an XML broadcast subtitle according to another embodiment of the present invention. XML subtitle data may be transmitted in a separate ES for each begin time of subtitle data. An upper part of FIG. 3 is a diagram for explanation of a procedure of converting XML subtitle data into a stream. The subtitle data may be converted into an XML subtitle ES at the ES level. When the subtitle data is converted into an XML subtitle ES, different XML subtitle ESs may be generated for respective display times of the subtitle data, i.e., respective begin times of the subtitle. The XML, subtitle ES may include begin and end time information of the ES. The XML subtitle ES may include subtitle data included at the corresponding begin and end time. For example, an XML subtitle ES1 may include subtitle information between begin time 00:00:00:00 and end time 00:00:01:00, an XML subtitle ES2 may include subtitle information between begin time 00:00:01:00 and end time 00:00:03:00, and an XML subtitle ES3 may include subtitle information between begin time 00:00:03:00 and end time 00:00:04:00.

Each ES may be converted into a PES at the PES level. The PES may be formed by packetizing an ES and each ES may be packetized together with a PES header. Here, the PES header may include PTS information. In FIG. 3, the XML subtitle ES1 may have PTS 360, the XML subtitle ES2 may have PTS 540, and the XML subtitle ES3 may have PTS 720. Each PES may be converted into a TS via a multiplexing procedure and the TS may include a TS header and a TS payload. The TS header may include PCR information. The PTS information and the PCR information may be used for synchronization between a subtitle and video, and a subtitle and video having the same PTS information may be synchronized with each other and displayed. The TS payload may include a subtitle PES described in the present invention.

A lower part of FIG. 3 illustrates detailed information included in the XML subtitle ES1 and the XML subtitle ES2. A repeated description of FIG. 2 will be omitted here. The XML subtitle ES1 and XML subtitle ES2 of FIG. 3 may have similar subtitle data information and may be different in that subtitle contents according to begin time of a subtitle are different. That is, the XML subtitle ES1 may include <tt:p region="region1" style="Style1" begin="00:00:00:00" end="00:00:01:00"> text line 1 </tt:p> and the XML subtitle ES2 may include <tt:p region="region1" begin="00:00:01:00" end="00:00:03:00"> text line 2 </tt:p>. That is, a text line 1 and a text line 2 may be transmitted in separate respective ESs because the text lines 1 and 2 have different begin times, that is, 00:00:00:00 and 00:00:01:00.

The method of providing a subtitle service with only information in the ES described with reference to FIG. 2, that is, the method of transmitting <tt:head> and <tt:body> in the ES may be expanded to consider a method of aligning presentation time (i.e., 'begin' in <tt:div>) of the XML subtitle with a PTS. That is, as illustrated in FIG. 3, <tt:body> may be divided into a unit of <tt:p> according to time and may be transmitted together with corresponding required <tt:head>, and only one begin time is present in the ES and, thus, a PTS of the PES header may be synchronized with begin time (begin timing) indicated by begin of <tt:p>. That is, synchronization between the XML, subtitle and video audio may be performed with only the PTS of the PES header.

Although the aforementioned method of scenario 1 is advantageous in that information (syntax according to XML grammar) required for subtitle reproduction can be processed at one time, a bandwidth may be ineffectively used since overlapping information is transmitted. As a method for overcoming this, overlapping information and subtitle information may be separated and transmitted. That is, <tt:body> containing subtitle information according to time and <tt:head> containing style and region information referred to show the subtitle information through a screen may be separately transmitted. Hereinafter, a method of separating overlapping information of an XML subtitle and configuring an ES according to scenario 2 will be described.

FIG. 4 is a diagram of a method of separating a head and a body included in an XML subtitle to different ESs and transmitting the XML subtitle according to an embodiment of the present invention. In this case, <tt:head> stored in a buffer of a receiver needs to have <tt:layout> and <tt:styling> information required for <tt:body> and may refer to a plurality of <tt:body> that is subsequent to <tt:head> according to a decoding/presentation order. When <tt:head> needs to refer to new <tt:layout> and <tt:styling> that are not present in the existing <tt:head>, a transmitter may newly transmit <tt:head> or may transmit only required information (e.g., <tt:style> and <tt:region>) and then perform update. A transmission period of <tt:head> may comply with a video random access point (RAP) in order to provide a stable service in an environment such as channel change and may have an epoch concept like in an existing DVB subtitle. In the embodiment of FIG. 4, a PTS of each PES header may be aligned with begin time of a first shown subtitle of a corresponding ES and end time of the subtitle and begin time of a subsequent subtitle may be acquired via calculation. Also, a case in which <tt:body> is subdivided according to a time unit like in the described example in scenario 1 may be considered.

XML subtitle data may be transmitted while a head and a body of the subtitle data are included in separate respective ESs. An upper part of FIG. 4 is a diagram for explanation of a procedure of converting XML subtitle data into a stream. The subtitle data may be converted into an XML subtitle ES at the ES level. When the subtitle data is converted into the XML subtitle ES, the head and the body of the subtitle data may be included in different XML subtitle ESs, respectively. The XML, subtitle ES may include begin and end time information of the ES. In addition, the XML subtitle ES may include subtitle data included at the corresponding begin and end time. However, an XML subtitle ES including only head information may not include begin time, end time, and subtitle text data. For example, in FIG. 4, an XML subtitle ES1 includes only head information and, thus, begin and end time information is not illustrated. However, an XML subtitle ES2 may include subtitle information between begin time 00:00:00:00 and end time 00:00:07:00 and an XML subtitle ES3 may include subtitle information between begin time 00:00:10:00 and end time 00:00:18:00.

Each ES may be converted into a PES at the PES level. The PES may be formed by packetizing an ES and each ES may be packetized together with a PES header. Here, the PES header may include PTS information. In FIG. 4, the XML subtitle ES1 may have PTS 360, the XML subtitle ES2 may have PTS 360, and the XML subtitle ES3 may have PTS 2160. The XML subtitle ES1 and the XML subtitle ES2 may include head and body information of the same subtitle data and, thus, may have the same PTS value.

Each PES may be converted into a TS via a multiplexing procedure and the TS may include a TS header and a TS payload. The TS header may include PCR information. The PTS information and the PCR information may be used for synchronization between a subtitle and video, and a subtitle and video having the same PTS information may be synchronized with each other and displayed. The TS payload may include a subtitle PES described in the present invention.

A lower part of FIG. 4 illustrates detailed information included in the XML subtitle ES1 and the XML subtitle ES2. The XML subtitle ES1 and XML subtitle ES2 of FIG. 4 may each include head and body information of the same subtitle data. That is, the, XML subtitle ES1 may include information from <tt:head> to </tt:head> and the XML subtitle ES2 may include information from <tt:body> to </tt:body>. That is, the head may include style information and layout information of the subtitle and the body may include text information of the subtitle.

FIG. 5 is a method of separating a head and a body included in an XML subtitle to different ESs and transmitting the ESs according to another embodiment of the present invention. A transmitter may separate and transmit <tt:body> according to begin time of each subtitle as illustrated in FIG. 5. Start time of each subtitle may have one to one correspondence with a PTS of a PES header.

XML subtitle data may be transmitted while a head and a body of the subtitle data are included in separate respective ESs and the body is included in a separate ES for each begin time of subtitle data. An upper part of FIG. 5 is a diagram for explanation of a converting XML subtitle data into a stream. The subtitle data may be converted into an XML subtitle ES at the ES level. When the subtitle data is converted into the XML subtitle ES, the head and the body of the subtitle data may be included in different XML subtitle ESs, respectively. In addition, the head and the body of the subtitle data may be included in different XML subtitle ESs for respective display times of subtitle data included in the body of the subtitle data, i.e., respective begin times of the subtitle.

The XML subtitle ES may include begin time and end time of the ES. In addition, the XML subtitle ES may include subtitle data included in corresponding begin and end time. However, an XML subtitle ES including only head information may not include begin time, end time, and subtitle text data. For example, in FIG. 5, an XML subtitle ES1 includes only head information and, thus, begin and end time information is not illustrated. However, an XML subtitle ES2 may include subtitle information between begin time 00:00:00:00 and end time 00:00:01:00 and an XML subtitle ES3 may include subtitle information between begin time 00:00:01:00 and end time 00:00:03:00.

Each ES may be converted into a PES at the PES level. The PES may be formed by packetizing an ES and each ES may be packetized together with a PES header. Here, the PES header may include PTS information. In FIG. 5, the XML subtitle ES1 may have PTS 360, the XML subtitle ES2 may have PTS 360, and the XML subtitle ES3 may have PTS 540. The XML subtitle ES1 and the XML subtitle ES2 may include head and body information of the same subtitle data and, thus, may have the same PTS value.

Each PES may be converted into a TS via a multiplexing procedure and the TS may include a TS header and a TS payload. The TS header may include PCR information. The PTS information and the PCR information may be used for synchronization between a subtitle and video, and a subtitle and video having the same PTS information may be synchronized with each other and displayed. The TS payload may include a subtitle PES described in the present invention.

A lower part of FIG. 5 illustrates detailed information included in the XML subtitle ES1 and the XML subtitle ES2. A repeated description of FIG. 2 will be omitted here. The XML subtitle ES1 and XML subtitle ES2 of FIG. 5 may each include head and body information of the same subtitle data. That is, the XML subtitle ES1 may include information from <tt:head> to </tt:head> and the XML subtitle ES2 may include information from <tt:body> to </tt:body>. That is, the head may include style information and layout information of the subtitle and the body may include text information of the subtitle. In addition, the text information of the subtitle included in the body may be transmitted in the XML, subtitle ES2, the XML subtitle ES3, and the XML subtitle ES4 according to respective begin times of subtitle data.

Here, each XML subtitle ES may transmit whole grammar in <tt:body> or <tt:div > but may be transmitted in a low unit of <tt:p> in order to enhance efficiency. That is, in FIG. 5, each XML subtitle ES may include the remaining information except for overlapping information. Information that overlaps and is not included in an ES may be processed by an XML decoder of the receiver. For example, in FIG. 5, the XML subtitle ES1 may be configured with whole grammar including <tt:head>. <tt:tt ttp:timeBase="media" xml:lang="en"> and </tt:tt> of content of the XML subtitle ES2 generated subsequently to the XML subtitle ES1 overlaps with content of the XML subtitle ES1 and, thus the XML subtitle ES2 may be configured by excluding this. In addition, the XML subtitle ES3 may be configured except for overlapping content with content of the XML subtitle ES1 and the XML subtitle ES2. That is, <tt:tt ttp:timeBase="media" xml:lang="en">, <tt:body>, </tt:body>, and </tt:tt> may be excluded from configuration of the XML subtitle ES3. Similarly, the XML subtitle ES4 may be configured except for <tt:tt ttp:timeBase="media" xml:lang="en">, <tt:body>, <tt:div style="BaseStyle">, </tt:div>, </tt:body>, and </tt:tt> from the illustrated content.

Contents excluded from the XML subtitle ES due to overlapping may be restored or processed by a decoder of the receiver, as described above.

FIG. 6 is a diagram illustrating a configuration of transport_packet according to an embodiment of the present invention. The transport_packet may include a sync_byte field, a transport_error_indicator field, a payload_unit_start_indicator field, a transport_priority field, a PID field, a transport_scrambling_control field, an adaptation_field_control field, a continuity_counter field, and a data_byte field.

The sync_byte field may be a fixed 8-bit field with a value of '0100 0111'(0x47). This may indicate start of a TS packet.

The transport_error_indicator field may be a 1-bit flag and may indicate that at least one unrestorable bit error is present in a corresponding TS packet when a value of the field is set to 1.

The payload_unit_start_indicator field may be a 1-bit flag and may indicate that a TS packet includes a PES packet or PSI data.

The transport_priority field may be a 1-bit indicator and may indicate higher priority than other packets having the same PID when a value of the field is set to 1.

The PID field may be a 13-bit field and may indicate a type of data included in a packet payload.

The transport_scrambling_control field may be a 2-bit field and may indicate a scrambling mode of a TS packet payload.

The adaptation_field_control field may be a 2-bit field and may indicate whether an adaptation field and/or a payload are included subsequently to a corresponding TS packet. When the adaptation_field_control field has a value of 10 or 11, this may indicate that an adaptation field is included subsequently to a corresponding TS packet header, which will be described in detail with reference to FIG. 7.

The continuity_counter field may be a 4-bit field and may be a sequence, a value of which increases every TS packet having the same PID.

The data_byte field may be applied when a payload is present, that is, when the adaptation_field_control has a value of 01 or 11, and in the present invention, the data_byte field may include a PES packet including subtitle data.

FIG. 7 is a diagram illustrating a configuration of an adaptation field according to an embodiment of the present invention. The adaptation field may include an adaptation_field_length field, a discontinuity_indicator field, a random_access_indicator field, an elementary_stream_priority_indicator field, a PCR_flag, an OPCR_flag, a splicing_point_flag, a transport_private_data_flag, an adaptation_field_extension_flag, a program_clock_reference_base field, a program_clock_reference_extension field, an original_program_clock_reference base field, an original_program_clock_reference_extension field, a splice_countdown field, a transport_private_data_length field, a private_data_byte field, an adaptation_field_extension_length field, an ltw_flag (legal_time_window_flag), a piecewise_rate_flag, a seamless_splice_flag, an ltw_valid_flag (legal time window_valid_flag), an ltw_offset (legal time window_offset) field, a piecewise_rate field, a splice_type field, a DTS_next_au (decoding_time_stamp_next_access_unit) field, and/or a stuffing_byte field.

The adaptation_field_length field may be an 8-bit field and may indicate a byte number of information subsequent to the adaptation_field_length field of the adaptation_field.

The discontinuity_indicator field may be a 1-bit field and may indicate that a discontinuous state of a current TS packet is true when a value of the field is set to 1.

The random_access_indicator field may be a 1-bit field and may indicate that a current TS packet and a next TS packet having the same PID as possible include information for assisting random access. That is, the field may indicate a case in which a corresponding ES packet is used in random access and may be 1 when an XML subtitle is aligned with a RAP. The field may be used to align a period for transmitting reconfiguration information of the XML subtitle with RAP, in particular, a period for separately transmitting head information like in the aforementioned scenario 2 with the RAP.

The elementary_stream_priority_indicator field may be a 1-bit field and may indicate priority of ES data included in a payload of a corresponding TS packet among TS packets having the same PID. That is, the field may indicate priority of the ES packet. In this regard, when a head segment needs to be aligned with a RAP or a period (a concept such as epoch) of a subtitle itself like in the aforementioned scenario 2, the present field may be set to 1 and may be preferentially processed by a decoder.

The PCR_flag may be a 1-bit flag and may indicate that the adaptation_field includes a PCR field encoded with two parts when a value of the PCR_flag is 1.

The OPCR flag may be a 1-bit flag and may indicate that the adaptation_field includes an OPCR field encoded to two parts when a value of the OPCR_flag is 1.

The splicing_point_flag may be a 1-bit flag and may indicate that the splice_countdown field is present in the associated adaptation field when a value of the splicing_point_flag is set to 1.

The transport_private_data_flag may be a 1-bit flag and may indicate that the adaptation_field includes one or more private_data bytes when a value of the transport_private_data_flag is set to 1.

The adaptation_field_extension_flag may be a 1-bit flag and may indicate that adaptation field extension is present when a value of the adaptation_field_extension_flag is set to 1.

The program_clock_reference_base field may be a 33-bit field and a value thereof may be given according to PCR_base(i).

The program_clock_reference_extension field may be a 9-bit field and a value thereof may be given according to PCR_ext(i). The program_clock_reference_base field and the program_clock_reference_extension field may be two parts included in the program_clock_reference (PCR) field that is a 42-bit field.

The original_program_clock_reference_base field and the original_program_clock_reference_extension field may be two parts included in the optional original program reference (OPCR) field of 42 bits.

The splice_countdown field may be an 8-bit field and may be represented with a positive or negative value. The positive value may specify the remaining number of TS packets of the same PID prior to a splicing point.

The transport_private_data_length field may be an 8-bit field and may specify the number of private_data bytes subsequent to the transport_private_data_length.

The private_data_byte field may be an 8-bit field.

The adaptation_field_extension_length field may be an 8-bit field and may indicate a byte number of an extended adaptation field subsequent to this field.

The ltw_flag (legal_time_window_flag) may be a 1-bit flag and may indicate that the ltw_offset field is present when a value of the ltw_flag is set to 1.

The piecewise_rate_flag may be a 1-bit flag and may indicate that the piecewise_rate field is present when a value of the piecewise_rate_flag is set to 1.

The seamless_splice_flag may be a 1-bit flag and may indicate that the splice_type field and the DTS_next_AU field are present when a value of the seamless_splice_flag is set to 1.

The ltw_valid_flag (legal time window_valid_flag) may be a 1-bit flag and may indicate that a value of the ltw_offset is valid when a value of the ltw_valid_flag is set to 1.

The ltw_offset (legal time window_offset) field may be a 15-bit field and a value thereof may be defined only when the ltw_valid_flag has a value of 1.

The piecewise_rate field may be a 22-bit field and a value thereof may be defined only when both the ltw_flag and the ltw_valid_flag are set to 1.

The splice_type field may be a 4-bit field and may define the splice_decoding_delay and the max_splice_rate.

The DTS_next_AU (decoding_time_stamp_next_access_unit) field may be a 33-bit field encoded with three parts and may indicate decoding time of a first access unit subsequent to a splicing point.

The stuffing_byte field may be a fixed 8-bit field having a value of '1111 1111' inserted by an encoder.

FIG. 8 is a diagram illustrating a configuration of PES_packet according to an embodiment of the present invention. FIG. 8 illustrates some of elements included in the PES_packet, which are associated with the present invention.

The PES_packet field may include a packet_start_code_prefix field, a stream_id field, a PES_packet_length field, a PES_scrambling_control field, a PES_priority field, a data_alignment_indicator, a copyright field, an original_or_copy field, a PTS_DTS_flags, an ESCR_flag, an ES_rate_flag, a DSM_trick_mode_flag, an additional_copy_info_flag, a PES_CRC_flag, a PES_extension_flag, a PES_header_data_length_field, a PTS field, a marker_bit, a PES_private_data_flag, a pack_header_field_flag, a program_packet_sequence_counter_flag, a P-STD_buffer_flag, a PES_extension_flag_2, a PES_private_data field, a pack_field_length field, a pack_header( ) field, a stuffing_byte field, a PES_packet_data_byte field, and/or a padding_byte field.

The packet_start_code_prefix field may be a 24-bit code and may configure a packet start code for identifying start of a packet together with the following stream_id.

The stream_id field may specify a type and number of an elementary steam. That is, the stream_id field may indicate a type of streams transmitted through the PES packet and, in the present invention, an XML-based subtitle may be set to private_stream_1 '1011 1101' or private_stream_2 '1011 1111'.

The PES_packet_length field may be a 16-bit field and may specify a byte number of a PES packet subsequent to the ES_packet_length field.

The PES_scrambling_control field may be a 2-bit field and may indicate a scrambling mode of a PES packet payload.

The PES_priority field may be a 1-bit field and may indicate priority of a payload in a corresponding PES packet.

The data_alignment_indicator may be a 1-bit flag and may indicate that a video syntax element or an audio sync word is subsequent to a corresponding PES packet header when a value of the data_alignment_indicator is set to 1.

The copyright field may be a 1-bit field and may indicate that content of a corresponding PES packet payload is protected by copyright.

The original_or_copy field may be a 1-bit field and may indicate that a corresponding PES packet payload is original when a value of the field is set to 1.

The PTS_DTS_flags may be a 2-bit flag and may indicate that a PTS field is present in a PES packet header when a value of the PTS_DTS_flags is set to '10'. When the value is '11', the PTS_DTS_flags may indicate that a PTS field and a DTS field are present in the PES packet header, and when the value is '00', the PTS_DTS_flags may indicate that a PTS field and a DTS field are not present in the PES packet header.

The ESCR_flag may be a 1-bit flag and may indicate that an ESCR base and extension fields are present in a PES packet header when a value of the ESCR_flag is set to 1.

The ES_rate_flag may be a 1-bit flag and may indicate that the ES_rate field is present in a PES packet header when a value of the ES_rate_flag is set to 1.

The DSM_trick_mode_flag may be a 1-bit flag and may indicate that an 8-bit trick mode field is present when a value of the DSM_trick_mode_flag is set to 1.

The additional_copy_info_flag may be a 1-bit flag and may indicate that the additional_copy_info field is present when a value of the additional_copy_info_flag is set to 1.

The PES_CRC_flag may be a 1-bit flag and may indicate that the CRC field is present in a PES packet when a value of the PES_CRC_flag is set to 1.

The PES_extension_flag may be a 1-bit flag and may indicate that an extension field is present in a PES packet header when a value of the PES_extension_flag is set to 1.

The PES_header_data_length field may be an 8-bit field and may specify a total number of stuffing bytes and bytes occupied by an optional field included in a corresponding PES packet header.

The presentation time stamp (PTS) field may indicate presentation time as a 33-bit number encoded with three separated fields. In the present invention, the PTS may be used to synchronize an XML subtitle service with video and audio and use the XML subtitle service. In this case, the PTS may be set to have the same meaning as begin in the XML subtitle.

The marker_bit may be a 1-bit field and a value thereof may be set to 1.

The PES_private_data_flag may be a 1-bit flag and may indicate that a PES packet header includes private data when a value of the PES_private data flag is set to 1.

The pack_header_field_flag may be a 1-bit flag and may indicate that a PES packet header stores an ISO/IEC 11172-1 pack header or a Program Stream pack header when a value of the pack_header_field_flag is set to 1.

The program_packet_sequence_counter_flag may be a 1-bit flag and may indicate that program_packet_sequence_counter, an MPEG1_MPEG2_identifier, and original_stuff_length fields are present in a corresponding PES packet when a value of the program_packet_sequence_counter_flag is set to 1.

The P-STD_buffer_flag may be a 1-bit flag and may indicate that the P-STD_buffer_scale and the P-STD_buffer_size are present in a corresponding PES packet header.

The PES_extension_flag_2 may be a 1-bit field and may indicate that the PES_extension_field_length field and related fields are present.

The PES_private_data field may be a 16-bit field and may include private data. In the present invention, system_clock_frequency for aligning a time line in an XML subtitle with a time line according to the PTS may be required. In the present invention, although the system_clock_frequency field is defined in the PES_data_field( ), the system_clock_frequency field may be defined in the PES header using the PES_private_data field.

The pack_field_length field may be an 8-bit field and may indicate a length of the pack_header_field( ) in bytes The stuffing_byte field may have a fixed 8-bit value of '1111 1111' and may be inserted by an encoder.

The PES_packet_data_byte field may include ES data determined by a PID or stream_id of a packet. The PES_packet_data_byte field may define the XML subtitle ES. The PES_data_field( ) defined in the present invention may be positioned in the PES_packet_data_byte field. The PES_data_field( ) will be described in detail with reference to FIG. 9.

The padding_byte field may have a fixed 8-bit value of '1111 1111' and may be removed by a decoder.

FIG. 9 is a diagram illustrating a PES_data_field according to an embodiment of the present invention. The PES_data_field illustrated in an upper part of FIG. 9 may include a data_identifier field, a subtitle_stream_id field, a system_clock_frequency field, an XML_subtitle_segment_field, and/or an end_of_PES_data_field_marker field.

The data_identifier field may indicate a subtitle stream. According to the present invention, when an XML-based subtitle is provided, the data_identifier field may be determined with 0x21.

The subtitle_stream_id field may identify a type of an XML-based subtitle stream. A middle part of FIG. 9 is a diagram illustrating the subtitle_stream_id and an XML subtitle type corresponding thereto according to an embodiment of the present invention. The XML-based subtitle may be based on TTML and may be SMPTE-TT formed by expanding TTML or YouView that restrictedly uses TTML. Like EBU-TT, EBU-TT-D, and CFF-TT, a function of the TTML may be optionally used and a required element may be additionally defined. An XML subtitle type corresponding to the subtitle_stream_id may include TTML, SMPTE-TT, EBU-TT-D, EBU-TT, CFF-TT, and YouView.

The subtitle_division_type field may divide a transmission unit for transmission of an XML-based subtitle. For example, Embodiments 1 and 2 of scenario 1 are classified according to whether sentences are grouped into mean paragraphs or sentences are separately transmitted. The subtitle_division_type may be expanded and used as a signal for division into a unit as illustrated in a lower part of FIG. 9. The subtitle_division_type may be defined as a 4-bit field and may refer to division of mean unit of sentences, division according to scenes, division according to a RAP, division according to a speaker, and/or division according to sentences according to a value of the subtitle_division_type.

A broadcast signal transmitter according to an embodiment of the present invention may divide the XML-based subtitle into mean units of a sentence, may divide the XML-based subtitle according to a RAP, may divide the XML-based subtitle according to a speaker, or may divide the XML-based subtitle according to sentences, and may transmit the XML-based subtitle. That is, the broadcast signal transmitter may divide and transmit the XML subtitle based on the subtitle_division_type. Here, division and transmission of the XML-based subtitle may refer to separate transmission of ESs. In addition, as necessary, the above dividing method may be systemized in stages.

The system_clock_frequency field may be used to synchronize TTML internal time and PTS time and may indicate a clock frequency of a transmission system. Media time and the PTS may have the following relationship.

$$PTS=(system\_clock\_frequency*media\ time/300)\ \%\ 2^{33}$$

The XML_subtitle_segment field may be a part for transmitting an XML-based subtitle element. According to an embodiment of the present invention, as a method of transmitting the XML-based subtitle, XML_head_segment for transmitting header information, XML_body_segment for transmitting body information, and XML_tt_segment for transmitting header information and body information together may be transmitted in this field.

The end_of_PES_data_field_marker field may be an 8 bit field that indicates a last portion of the PES data field and has a value of '1111 1111'.

FIG. 10 is a diagram illustrating a configuration of XML_tt_segment according to an embodiment of the present invention. That is, the XML_tt_segment may be used in a method of configuring an ES with all information items for subtitle configuration according to scenario 1. As illustrated in an upper part of FIG. 10, the XML_tt_segment may include a sync_byte field, a segment_type field, a version_number field, a data_coding_type field, a segment_length field, and/or a tt_data_code field.

The sync_byte field may be an 8-bit field that divides a segment and has a value of '0000 1111'. During parsing in a PES packet, whether packet loss occurs may be checked using the segment length and the present field.

As illustrated in a lower part of FIG. 10, the segment_type field may indicate a type of an XML subtitle segment. The segment_type field may refer to <tt:tt> including a head and a body when the segment_type field has a value of 0001. That is, the XML_tt_segment may indicate an XML subtitle that is completely configured with a head and a body using a value of '0001'. In addition, the segment_type field may refer to <tt:head>, a segment of which includes a head, when the field has a value of 0010, which will be described with reference to FIG. 11. The segment_type field may refer to <tt:body>, a segment of which includes a body, when the field has a value of 0011, which will be described with reference to FIG. 12.

The version_number field may indicate a version of currently transmitted XML subtitle information.

The data_coding_type field may refer to a transmission form of data transmitted to a segment. For example, the data_coding_type field may include Unicode, run length coding of string, etc.

The segment_length field may indicate a length of data_code.

The tt_data_code field may indicate XML subtitle information configured with an actual XML language. For example, in the case of EBU-TT-D, <tt:tt> including <tt:head> and <tt:body> may be transmitted and, in this case, it may be ineffective in terms of transmission in that information such as head is redundantly transmitted, but XML configurations for providing a subtitle service are simultaneously transmitted and, thus, the tt_data_code field may be used in consideration of accuracy of information or handling of channel change. In this case, <tt:body> may include a subtitle line having begin time synchronized with a PTS and a subtitle line to be adjacently provided to next time based on presentation. In addition, <tt:head> may include style and layout information required to display <tt:body> on a screen.

FIG. 11 is a diagram illustrating a configuration of XML_head_segment according to an embodiment of the present invention. As illustrated in an upper part of FIG. 11, the XML_head_segment may include a sync byte field, a segment_type field, a head_update_type field, a version_number field, a data_coding_type field, a segment_length field, and/or a head_data_code. A repeated description of FIG. 10 of a description of each field will be omitted here.

The segment_type field may indicate a type of an XML subtitle segment and indicate head information using a value of '0010' in the case of the XML_head_segment. Alternatively, the present field may be matched with elements in <tt:head> on a one-by-one basis and may be subdivided into <tt:styling>, <tt:layout>, <tt:style>,<tt:region>, etc. according to information of the head_data_code.

As illustrated in a lower part of FIG. 11, the head_update_type field may classify a type of a head transmitted in the present segment. For example, the following cases may be considered.

1) Update: When Currently Transmitted Head Information is Information Added to Previous Head Information In this case, XML syntax in the head_data_code may be configured in the form of <tt:head> or <tt:tt> and only <tt:styling> as added style information or <tt:layout> as layout information may be transmitted or may be transmitted in the form of <tt:style> or <tt:region> that are elements of <tt:styling> or <tt:layout>. A head buffer may add the transmitted information to existing information. This method may be used when only necessary information is transmitted to prioritize transmission efficiency and decoding time efficiency in consideration of a time point in which additional information is needed in existing head information in order to process an XML subtitle to be transmitted for a next predetermined period.

2) Refresh: When it is Possible to Process an XML Subtitle Using Currently Transmitted Head Information In this case, XML syntax in the head_data_code may be configured in the complete form of <tt:head> or <tt:tt> and may be transmitted. A head buffer may configure a new head while retaining existing information. This method may be used to transmit all head information items with a predetermined period for the case in which head information items required to process an XML subtitle to be transmitted for a next predetermined period is simultaneously transmitted, for example, the case for enhancing accuracy of information in consideration of error in pre-transmitted head information or the case in which all head information items are transmitted with a predetermined period in order to provide a subtitle service in consideration of channel change. In this case, the predetermined period may be matched with a random access point (RAP) of video or the information may be transmitted in a period that is internally separate in subtitles.

3) New: When Previous Head Information is Discarded and Currently Transmitted Head Information is Used In this case, XML syntax in the head_data_code may be configured in the complete form of <tt:head> or <tt:tt>. The case of New is similar to the case of refresh in that head information items required to process an XML, subtitle to be transmitted for a next predetermined period are simultaneously transmitted but the case of New and the case of refresh may be differentiated in that a head buffer is empty and is filled with currently transmitted information. The predetermined period may be matched with a random access point (RAP) of video or the information may be transmitted in a period that is internally separate in subtitles. In particular, the predetermined period may be used as the same concept as epoch of the existing DVB subtitle.

The head_data_code field may indicate head information configured with an actual XML language. For example, in the case of EBU-TT-D, information including <tt:tt> <tt:header>, <tt:styling>, <tt:layout>, <tt:style>, <tt:region>, <ttm:metadata>, and <ttm:copyright> may be transmitted.

FIG. 12 is a diagram illustrating a configuration of XML_body_segment according to an embodiment of the present invention. As illustrated in an upper part of FIG. 12, the XML_body_segment may include a sync byte field, a segment_type field, a content_type field, a version_number field, a data_coding_type field, a segment_length field, and a body_data_code. A repeated description of FIG. 10 or 11 of a description of each field will be omitted here.

The segment_type field may indicate a type of an XML subtitle segment and indicate body information using a value of '0010' in the case of XML_body_segment. Alternatively, the present field may be matched with elements in <tt:body> on a one-by-one basis and may be subdivided into <tt:div>, <tt:p>,<tt:span>, etc. according to information of the body_data_code.

As illustrated in a lower part of FIG. 12, the content_type field may classify a type of a body transmitted in the present segment. The type of the body may be classified through the present field. For example, the type of the body may be classified according to a mean unit of information transmitted with regard to time synchronization as follows, which will be described below in detail.

1) When a Subtitle is Divided and Transmitted According to Begin Time (Line Update on the Same Page)

In this case, the body of the XML, subtitle may be divided and transmitted in a unit of a PTS and may be transmitted in a unit of <tt:p> or <tt:span>. This case is advantageous in that a PTS of a PES header may use a value synchronized with begin in the XML subtitle and subtitle reproduction time is immediately recognized through the PTS. When the present field is used, it may be assumed that common style and region information in an upper stage is used without change. When common body information is change in an upper stage, that is, in a <tt:div> or <tt:body> unit, changed common body information may be transmitted together with a subtitle synchronized with a PTS using the following method.

2) When a Subtitle is Grouped into a Mean Unit and is Transmitted (Update in a Page Unit)

In this case, a body of an XML subtitle may be grouped and transmitted in a unit of <tt:div>, <tt:body>, or <tt:tt>. In this case, a PTS may be synchronized with a first started subtitle, and when one or more begin attributes are defined, next subtitles based on a first subtitle may convert begin in the XML subtitle and time defined in end attribute (in the case of EBU-TT-D, the time is defined in <tt:p>) into a PTS and may be synchronized with audio video. This method may be used to group and transmit subtitles having continuous begin time with an appropriate size when common information of a unit of <tt:div> or <tt:body> needs to be replaced like in page update, when subtitles are grouped and transmitted in a mean unit, or when subtitles are divided and transmitted to lower efficiency.

In addition to the aforementioned methods, the content_type field may be used to classify <tt:div>, <tt:p>, <tt:span>, etc. according to an XML subtitle body layer.

The body_data_code field may indicate head information configured with an actual XML language. For example, in the case of EBU-TT-D, information configured with <tt:tt>, <tt:body>, <tt:div>, <tt:p>, <tt:span>, <tt:br>, and <tt:region> may be transmitted.

In order to serve the XML subtitle described in the present invention, program information and service information need to be transmitted as illustrated in FIGS. 13 and 14. To this end, component descriptor may be defined in SDT and EIT of DVB-SI and an XML subtitle may be indicated through the stream_content and the component_type. In this case, the component_type indicating the XML subtitle may be newly defined as follows. In addition, subtitling_descriptor may be defined in a PMT and may describe details of the subtitle. As illustrated in FIG. 14, when the existing subtitling_descriptor is used, the XML subtitle may be indicated through the subtitling_type.

FIG. 13 is a diagram illustrating a method of applying an XML subtitle to a DVB subtitle service according to an embodiment of the present invention. FIG. 13 is a diagram illustrating a Service Description Table (SDT) of a DVB system.

The SDT according to an embodiment of the present invention may include a table_id field, a section_syntax_indicator field, a section_length field, a transport_stream_id field, a version_number field, a current_next_indicator field, a section_number field, a last_section_number field, an original_network_id field, a service_id field, an EIT_schedule_flag field, an EIT_present_following_flag field, a running_status field, a free_CA_mode field, a descriptors_loop_length field, a descriptor( ) and/or a CRC_32 field.

The table_id field may identify a type of a table. The table_id field may indicate that a corresponding table section is a section for configuring the SDT.

The section_syntax_indicator field may indicate a format of a table section subsequent to a corresponding field. When a value of the corresponding field is 0, the corresponding table section is a short format. When a value of the corresponding field is 1, the corresponding table section complies with a general long format.

The section_length field may indicate a length of a corresponding table section. The section_length field may indicate a length to end of the corresponding table section from a corresponding field.

The transport_stream_id field may identify a transport stream (TS) to be described in a corresponding table.

The version_number field may indicate a version number of a private table section. A receiver may search for a most recent table section among table sections stored in a memory using the corresponding field and the current_next_indicator field to be described below.

The current_next_indicator field may indicate that a currently transmitted table is valid when a value indicated by the field is 1 and the field may indicate that a currently transmitted table is not valid and is supposed to be valid when the value is 0.

The section_number field may indicate an order of a corresponding section of a corresponding table.

The last_section_number field may indicate an order of a last section among sections included in a corresponding table.

The original_network_id field may identify a first broadcaster that transmits a service described in a corresponding table.

The service_id field may identify each service present in a transport stream. The service_id field may have the same function as the program_number field in a PMT to be described below.

The EIT_schedule_flag field may indicate that an EIT schedule flag for a service is present in a current TS when a value of the field is 1 and the field may indicate that the EIT schedule flag is not present when the value is 0.

The EIT_present_following_flag field may indicate that EIT_present_following information for a service is present in a current TS when a value of the field is 1 and the field may indicate that the EIT_present_following information is not present when the value is 0.

The running_status field may indicate a state of a service. For example, the running_status field may indicate that a service is "not running" when a value of the field is 1, the field may indicate that the service is "starts in a few seconds" when the value is 2, the field may indicate that the service is "pausing" when the value is 3, the field may indicate "running" when the value is 4, and the field may indicate "service off-air" when the value is 5.

The free_CA_mode field may indicate that component streams for configuration of a service are not scrambled when a value of the field is 0 and the field may indicate that access to one or more streams is adjusted by a CA system when the value of the field is 1. The CA system may be an abbreviation of a Conditional Access System and may refer to a system that provides an encryption function of broadcast content and a function of decoding and watching broadcast content by only a contractor in order to limit broadcast viewing to the contractor.

The descriptors_loop_length field may indicate a value obtained by summing lengths of descriptors subsequent to a corresponding field.

The descriptor( ) may refer to a descriptor described with respect to each service. According to an embodiment of the present invention, the component_descriptor may be included in the aforementioned descriptor( ). The component_descriptor will be described below in detail with reference to FIG. 14.

The CRC_32 field may indicate a CRC value used to check whether error is present in a corresponding table section.

FIG. 14 is a diagram illustrating a configuration of a component_descriptor according to an embodiment of the present invention. The component_descriptor may include a descriptor_tag field, a descriptor_length field, a reserved_future_use field, a stream_content field, a component_type field, a component_tag field, an ISO_639_language_code field, a Number_of_language_minus1 field, and/or a text_char field.

The descriptor_tag field may identify each descriptor.

The descriptor_length field may specify a byte number of a descriptor subsequent to the descriptor_length field.

The reserved_future_use field may be defined or replaced with a Number_of_language_minus1 field in a Subtitling system according to the present invention. The Number_of_language_minus1 field may be a field that is newly defined by replacing the existing reserved_future_use field according to the present invention. A value obtained by adding 1 to a value of the Number_of_language_minus1 may indicate the number of languages supported by a subtitle. The reserved_future_use_field may have a value equal to or greater than 0 and may be used to determine Number_of_language_minus1*3 with respect to N that refers to a repetition number of times of for loop below.

The stream_content field may indicate a type of a stream. In the case of the DVB subtitle, the field may have a value of 0x03.

The component_type field may indicate detailed information of a stream with respect to the stream_type. 0x04 may be allocated to the field to indicate an XML subtitle.

The component_tag may have the same value as the component_tag field in the stream identifier descriptor for a component stream.

The ISO_639_language_code field may be a 24-bit code for representing three texts. A language of an XML subtitle may be represented using the field.

The text_char_field may contain a text for describing a component and perform the same function as the ISO_639_language_code by colleting three text_char in the subtitling system. When two or more languages are supported, the field may have N=Number_of_language_minus1*3.

FIG. 15 is a diagram illustrating a method of applying an XML subtitle to a DVB subtitle service according to an embodiment of the present invention. FIG. 15 is a diagram illustrating a configuration of a Program Map Table (PMT). The PMT may be a table for providing mapping between a program number and a program element. In order to provide a subtitle service, the subtitling_descriptor may be transmitted in the PMT.

The PMT may include a table_id field, a section_syntax_indicator field, a section_length field, a program_number field, a version_number field, a current_next_indicator field, a section_number field, a last_section_number field, a PCR_PID field, a program_info_length field, a stream_type field, an elementary_PID field, an ES_info_length field, a descriptor, and/or a CRC_32 field.

The table_id field may be an 8-bit field and the TS_program_map_section may be set to a value of 0x02.

The section_syntax_indicator field may be configured with 1 bit and may be set to 1.

The section_length field may be configured with 12 bits and first two bits of the field may be 00. The field may indicate a byte number of a section and indicate a length to CRC from the field. A value of the field may not exceed 1021.

The program_number field may be configured with 16 bits. The field may indicate a program to be applicable to the program_map_PID. Definition of one program may be transmitted by only one TS_program_map_section, which implies that program definition cannot exceed 1016.

The version_number field may be a 5-bit field and may indicate a version of the TS_program_map section. A value of the TS_program_map section may be increased on a one-by-one basis whenever the TS_program_map section is changed. When the version value reaches 31, a next version value may be 0.

The current_next_indicator field may be a 1-bit field and a value of the field may be set to 1 when the TS_program_map section is currently applicable. When the value is set to 0, the section is not applicable yet and the TS_program_map section is valid.

A value of the section_number field may be set to 0x00.

A value of the last_section_number field may be set to 0x00.

The PCR_PID field may be a 13-bit field and may refer to a PID of a TS packet including a valid PCR field for a program specified by a program number.

The program_info_length field may be a 12-bit field and first two bits of the field may have a value of 00. The remaining 10 bits may indicate a byte number of descriptors subsequent to the field.

The stream_type field may be an 8-bit field and may specify a type of a program element transmitted by a packet having a PID value specified by the elementary_PID.

The elementary_PID field may be a 13-bit field and may specify a PID of TS packets including a related program element.

The ES_info_length field may be a 12-bit field and first two bits of the field may be 00. The remaining 10 bits may specify a byte number of descriptors of a related program element subsequent to the field.

The descriptor may include the subtitling_descriptor according to the present invention, which will be described in detail with reference to FIG. 16.

The CRC_32 field may be a 32-bit field and may include a CRC value for acquisition of zero output of registers in a decoder.

FIG. 16 is a diagram illustrating a configuration of subtitling_descriptor according to an embodiment of the present invention. As a method of transmitting service information of an XML-based subtitle, the subtitling_descriptor that has been used in the existing DVB subtitle service may be used. In this case, when multiple languages are supported, the subtitling_descriptor may indicate a language of a subtitle through ISO_639_language_code and may be transmitted while a head and a body of an actually transmitted XML subtitle simultaneously contain elements of various languages. That is, multiple languages may be simultaneously contained in an ES, which may be embodied by outputting a language selected by an XML parser. The subtitling_descriptor may include a descriptor_tag field, a descriptor_length field, an ISO_639_language_code field, a subtitling_type field, a Compositon_page_id_field, and/or an ancillar_page_id field.

The descriptor_tag field may be used to identify each descriptor.

The descriptor_length field may specify a byte number of a descriptor subsequent to the descriptor_length field.

The ISO_639_language_code field may be a 24-bit code indicating a language of a subtitle. A language of an XML subtitle may be represented using the field. When multiple languages are represented, the ISO_639_language_code field may indicate only a representative language or may indicate all of the multiple languages.

The subtitling_type field may be set to have the same value as the component_type described with reference to FIG. 14 when stream content indicates a subtitle.

In this case, the Compositon_page_id and the ancillar_page_id may not be used.

Figure 17:
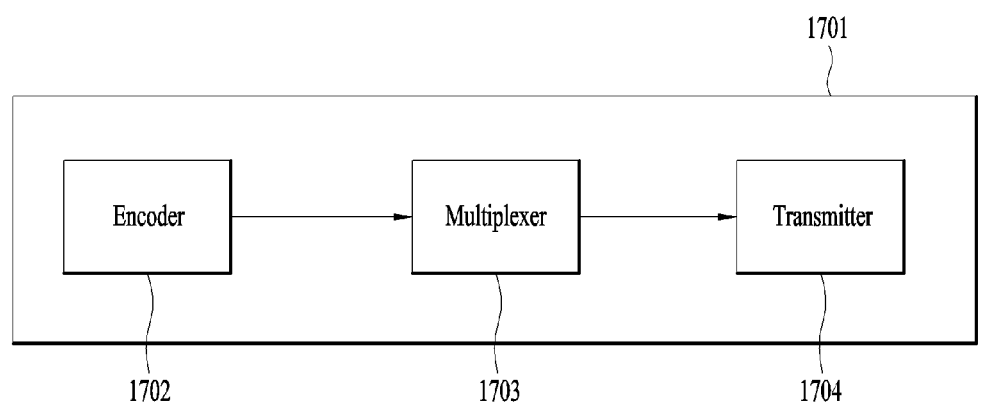
FIG. 17 is a block diagram illustrating a broadcast transmitter according to an embodiment of the present invention.

FIG. 17 is a block diagram illustrating a broadcast transmitter 1701 according to an embodiment of the present invention. The broadcast transmitter 1701 according to the present invention may include an encoder 1702, a multiplexer 1703, and/or a transmitter 1704.

The encoder 1702 may receive video data with resolution of UHD, HD, or SD and encode the video data to generate a video stream. Here, the video stream may be encoded according to High Efficiency Video Coding (HEVC). The video stream may refer to a video elementary stream (ES) or a video packetized elementary stream (PES) formed by packetizing a video ES.

The encoded video stream may be input to the multiplexer 1703 together with the XML subtitle stream. The method of configuring an XML, subtitle stream has been described above with reference to FIGS. 2 to 5 according to scenarios. That is, scenario 1 as a method of using the same ES to transmit a head and a body of XML subtitle data has been described above with reference to FIG. 2 and scenario 1 as a method of dividing subtitle data and transmitting in each ES according to presentation time has been described above with reference to FIG. 3. In addition, scenario 2 as a method of separating and transmitting a head and a body of XML subtitle data has been described above with reference to FIG. 4 and scenario 2 as a method of separating a body of subtitle data according to presentation time has been described above with reference to FIG. 5. A procedure of packetizing the XML subtitle ES to a PES and related information has been described above with reference to FIGS. 8 to 12.

The video stream output from the encoder 1702 may be input to the multiplexer 1703 together with a subtitle stream converted from subtitle data. The multiplexer 1703 may multiplex the encoded video stream and subtitle stream to generate a transport stream (TS). Here, the subtitle stream may be an XML subtitle stream. A procedure of generating a TS including a subtitle stream has been described above with reference to FIGS. 6 and 7.

As described above, the video stream and the XML subtitle stream may be synchronized with each other using PTS information. The PTS of the XML subtitle stream may be set to have the same meaning as begin of content of the XML subtitle as described with reference to FIG. 8.

The transmitter 1704 may transmit the transport stream output from the multiplexer 1703 as a broadcast signal. Here, the transport stream may be channel-coded and modulated before being transmitted and then may be transmitted as a broadcast signal.

Figure 18:
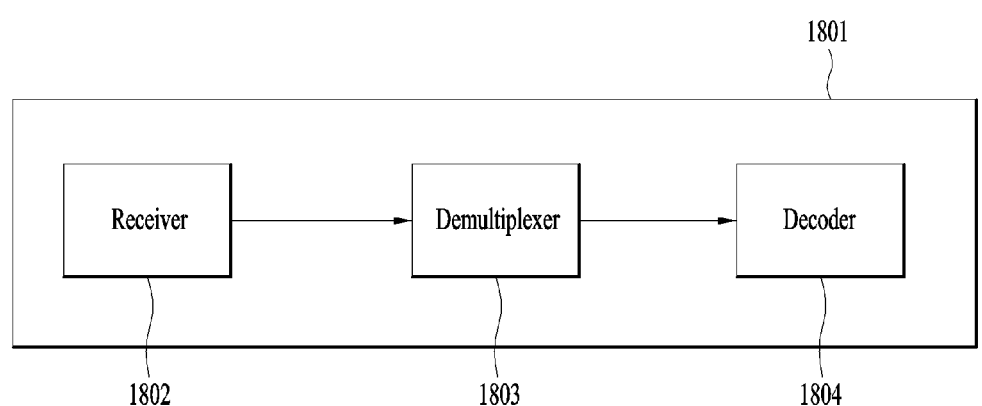
FIG. 18 is a block diagram illustrating a broadcast receiver according to an embodiment of the present invention.

FIG. 18 is a block diagram illustrating a broadcast receiver 1801 according to an embodiment of the present invention. The broadcast receiver 1801 according to the present invention may include a receiver 1802, a demultiplexer 1803, and/or a decoder 1804.

The receiver 1802 may demodulate the received broadcast signal and then may channel-decode the broadcast signal. The channel-decoded broadcast signal may be input to the demultiplexer 1803 and may be demultiplexed into a video stream and a subtitle stream. Output of the demultiplexer 1803 may be input to the decoder 1804 and may be divided into video data and subtitle data. That is, the video stream and the subtitle stream may be decoded by a video decoder and a subtitle decoded and may be output as video data and subtitle data, respectively. The video data and the subtitle data may be synchronized and may be displayed by a receiving device. A broadcast receiver according to an embodiment of the present invention will be described in detail with reference to FIG. 19.

Figure 19:
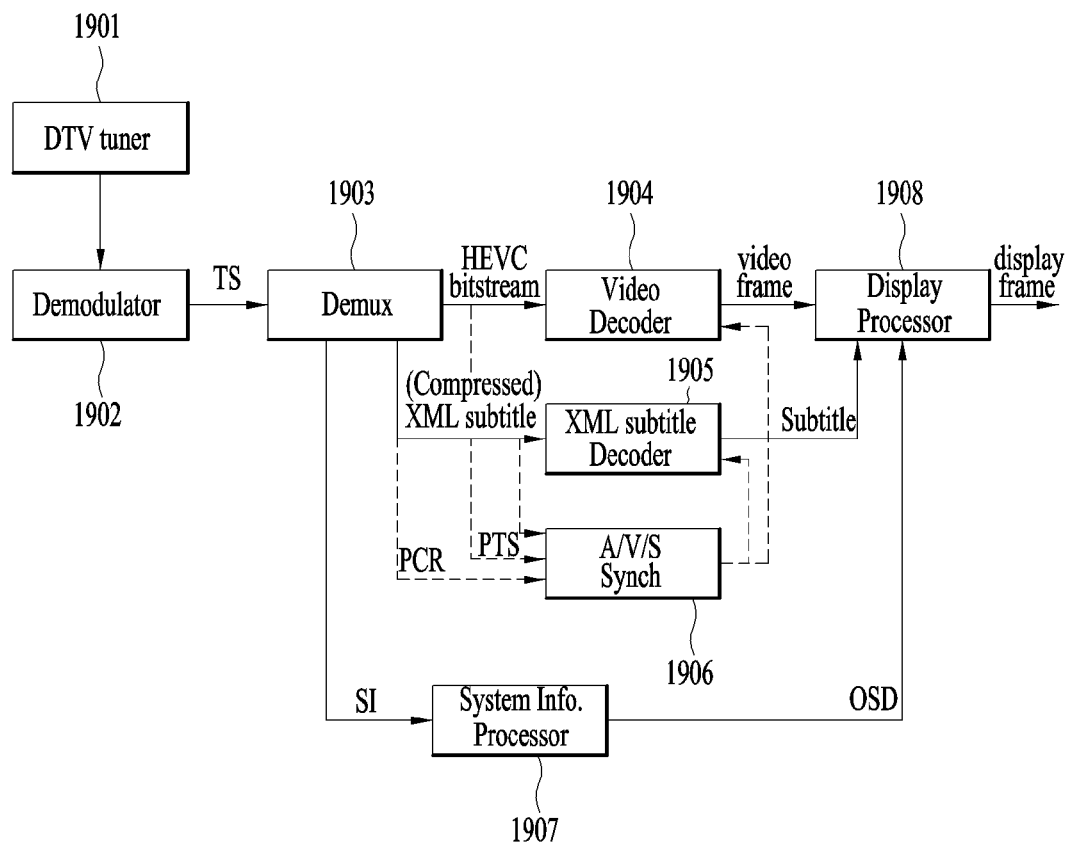
FIG. 19 is a diagram illustrating a detailed configuration of a broadcast receiver according to an embodiment of the present invention.

FIG. 19 is a diagram illustrating a detailed configuration of a broadcast receiver according to an embodiment of the present invention. The broadcast receiver may include a receiver 1901, a demodulator 1902, a demultiplexer 1903, a video decoder 1904, an XML subtitle decoder 1905, an audio video subtitle synchronizer (A/V/S sync) 1906, a system information (SI) processor 1907, and/or a display processor 1908.

The receiver 1901 may receive a broadcast signal transmitted by a transmitter. The received broadcast signal may be input to the demodulator 1902.

The demodulator 1902 may demodulate the broadcast signal to output a transport stream (TS). The TS may be input to the demultiplexer 1903 and may be demultiplexed. The demultiplexed TS may include an HEVC bitstream, an XML subtitle, and system information (SI). Here, the XML subtitle may be packetized or compressed.

The video decoder 1904 may receive and decode the HEVC bitstream to output a video frame.

The XML subtitle decoder 1905 may receive the XML subtitle and extract a subtitle. A detailed configuration of the XML subtitle decoder 1905 will be described with reference to FIGS. 20 and 21.

The A/V/S sync 1906 may receive a PTS and a Program Clock Reference (PCR) of each of the HEVC bitstream and the XML subtitle and synchronize a video frame and a subtitle.

The SI processor 1907 may receive SI information output from the demultiplexer and extract OSD information.

The display processor 1908 may receive the video frame and the subtitle and output a display frame. The display processor 1908 may receive on screen display (OSD) information together with the video frame and the subtitle and output a display frame. The output display frame may be displayed by an image output device and displayed together with the XML subtitle and the video frame described in the present invention.

Figure 20:
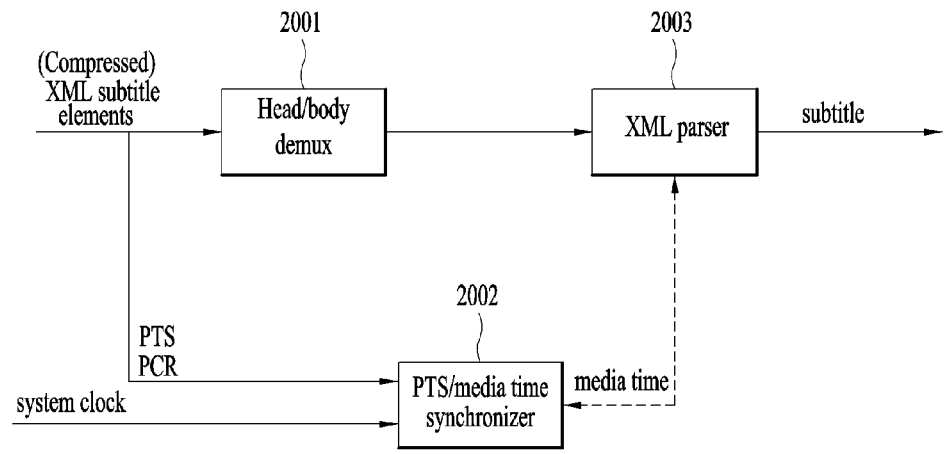
FIG. 20 is a diagram illustrating a configuration of an XML subtitle decoder according to an embodiment of the present invention.

FIG. 20 is a diagram illustrating a configuration of an XML subtitle decoder according to an embodiment of the present invention. FIG. 20 is related to the aforementioned scenario 1. The XML subtitle decoder may include a head/body demultiplexer 2001, a PTS/media time synchronizer 2002, and an XML parser 2003.

The head/body demultiplexer 2001 may receive XML subtitle element, demultiplex a head element and a body element, and transmit the head element and the body element to the XML parser 2003.

The PTS/media time synchronizer 2002 may receive PCR information acquired from a TS header, PTS information acquired from a PES header, and system clock information. The PTS/media time synchronizer 2002 may convert the PTS into media time in the XML subtitle. When the XML subtitle element is synchronized with the PTS and transmitted, the PTS/media time synchronizer 2002 may synchronize video and the XML subtitle using the PTS and the system clock without separate changes.

The XML parser 2003 may configure the XML subtitle based on information transmitted from the head/body demultiplexer 2001. A last output time point of the configured subtitle may be determined based on the signal synchronized with video through the PTS/media time synchronizer 2002. In addition, a signal may be applied to the XML parser 2003 so as to immediately output the subtitle synchronized with a PTS without separate processing of time.

Figure 21:
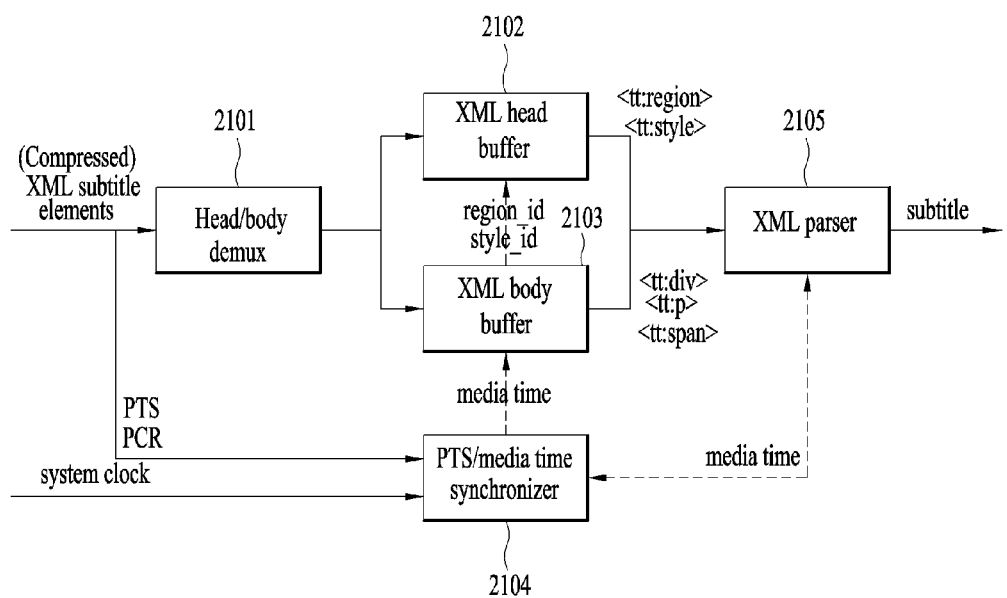
FIG. 21 is a diagram illustrating a configuration of an XML subtitle decoder according to another embodiment of the present invention.

FIG. 21 is a diagram illustrating a configuration of an XML subtitle decoder according to another embodiment of the present invention. FIG. 21 is related to the aforementioned scenario 2 and the XML subtitle decoder may include a head/body demultiplexer 2101, an XML head buffer 2102, an XML body buffer 2103, a PTS/media time synchronizer 2104, and/or an XML parser 2105.

The head/body demultiplexer 2101 may receive XML subtitle elements and demultiplex a head element and a body element. With respect to packetized XML subtitle elements acquired through a PES, the head/body demultiplexer 2101 may divide a head/body element (<tt:head>/<tt:body>) and store the divided head/body element in the XML head buffer 2102 and the XML body buffer 2103, which may refer to an embodiment of segment_type which is described with reference to a lower part of FIG. 10.

Here, <tt:head> may be divided as follows according to the head_update_type described with reference to a lower part of FIG. 11.

a) when currently transmitted head information is information added to previous head information b) when it is possible to process an XML subtitle for a next predetermined period using currently transmitted head information c) when previous head information is discarded and currently transmitted head information is used The XML head buffer 2102 may perform head adding information update in the case of a), may use new information without buffer empty in the case of b), and may empty a buffer and use new information in the case of c). The XML head buffer 2102 may transmit <tt:region> and <tt:style> as subtitle information to the XML parser 2105. Here, the transmitted <tt:region> and <tt:style> may be based on the region_id and style_id transmitted from the XML body buffer 2103 that will be described below.

In addition, <tt:body> may be divided as follows according to content_type described with reference to a lower part of FIG. 12.

a) when a subtitle is divided and transmitted according to begin time (line update in the same page)

b) when page update is performed or a subtitle is grouped and transmitted in a mean unit (update in a page unit)

The XML body buffer 2103 may transmit subtitle information (<tt:div>, <tt:p>, and <tt:span>) to the XML parser 2105. In this case, region_id as a reference of information required for displaying information included in a body on a screen and style_id as a reference of a font, a size, color, etc. of a subtitle may be transmitted to the XML head buffer 2102. Accordingly, corresponding information, that is, <tt:region> and <tt:style>may be transmitted to the XML parser 2105 from the XML head buffer 2102.

The PTS/media time synchronizer 2104 may receive PCR information acquired from a TS header, PTS information acquired from a PES header, and system clock information. The PTS/media time synchronizer 2104 may convert a PTS into media time in the XML subtitle. When the XML subtitle elements are synchronized with the PTS and are transmitted, the PTS/media time synchronizer 2104 may synchronize video and the XML subtitle using the PTS and the system clock without separate change.

The XML parser 2105 may configure the XML subtitle based on information transmitted from the XML head buffer 2102 and the XML body buffer 2103. A last output time point of the configured subtitle may be determined based on the signal synchronized with video through the PTS/media time synchronizer 2104. In addition, a signal may be applied to the XML parser 2105 so as to immediately output the subtitle synchronized with a PTS without separate processing of time.

Figure 22:
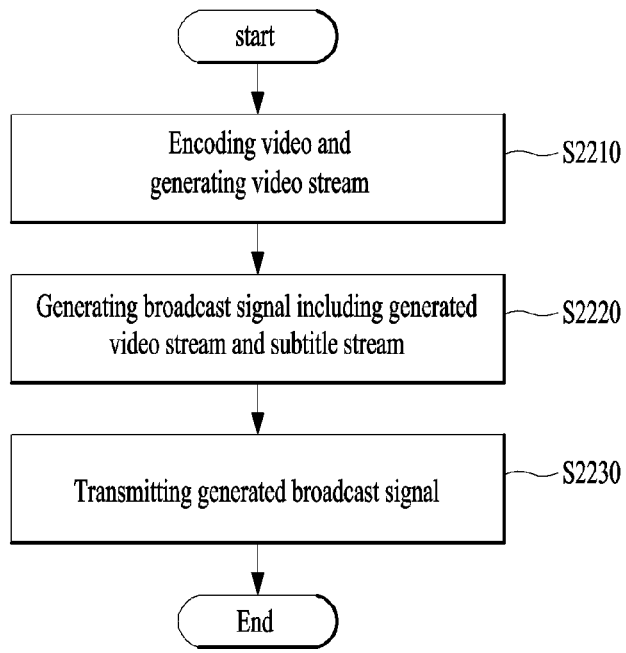
FIG. 22 is a diagram illustrating a method of transmitting an XML subtitle according to an embodiment of the present invention.

FIG. 22 is a diagram illustrating a method of transmitting an XML subtitle according to an embodiment of the present invention. The method of transmitting the broadcast signal including the XML subtitle may include encoding video to generate a video stream (S2210), generating a broadcast signal including the generated video stream and subtitle information (S2220), and transmitting the generated broadcast signal (S2230).

In the encoding video to generate a video stream (S2210), video data with resolution of UHD, HD, or SD may be received and video data may be encoded to generate the video stream. Here, the video stream may be encoded via High Efficiency Video Coding (HEVC). The video stream may refer to video elementary stream (ES) or video packetized elementary stream (PES) formed by packetizing a video ES. Simultaneously, the XML subtitle stream may be generated. A method of configuring the XML subtitle stream has been described above with reference to FIGS. 2 to 5. That is, scenario 1 as a method of using the same ES to transmit a head and a body of XML subtitle data has been described above with reference to FIG. 2 and scenario 1 as a method of dividing subtitle data and transmitting in each ES according to presentation time has been described above with reference to FIG. 3. In addition, scenario 2 as a method of separating and transmitting a head and a body of XML subtitle data has been described above with reference to FIG. 4 and scenario 2 as a method of separating a body of subtitle data according to presentation time has been described above with reference to FIG. 5. A procedure of packetizing the XML subtitle ES to a PES and related information has been described above with reference to FIGS. 8 to 12.

In the generating a broadcast signal including the generated video stream and subtitle information (S2220), the encoded video stream and the subtitle stream may be multiplexed to generate a transport stream (TS). Here, the subtitle stream may be an XML subtitle stream. A procedure of generating the TS including a subtitle stream has been described with reference to FIGS. 6 and 7. As described above, the video stream and the XML subtitle stream may be synchronized using the PTS information. The PTS of the XML subtitle stream may be set to have the same meaning as begin of content of the XML subtitle as described with reference to FIG. 8.

In the transmitting the generated broadcast signal (S2230), the transport stream may be transmitted as a broadcast signal. Here, the transport stream may be channel-coded and modulated before being transmitted and then may be transmitted as a broadcast signal.

Figure 23:
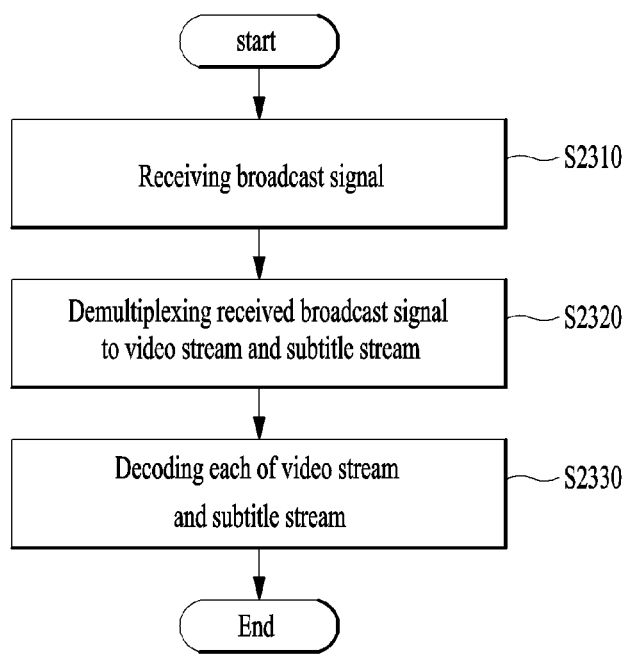
FIG. 23 is a diagram illustrating a method of receiving a broadcast signal including XML subtitles according to an embodiment of the present invention.

FIG. 23 is a diagram illustrating a method of receiving a broadcast signal including XML subtitles according to an embodiment of the present invention. The method of receiving the broadcast signal including the XML subtitle may include receiving a broadcast signal (S2310), demultiplexing the received broadcast signal into a video stream and a subtitle stream (S2320), and decoding a video stream (S2330).

In the receiving a broadcast signal (S2310), the received broadcast signal may be demodulated and channel-decoded via a receiver.

In the demultiplexing the received broadcast signal into a video stream and a subtitle stream (S2320), the channel-decoded broadcast signal may be demultiplexed into the video stream and the subtitle stream via a demultiplexer.

In the decoding the video stream and the subtitle stream (S2330), the video stream may be decoded to acquire video data via a video decoder. In the operation, the subtitle stream may be decoded to acquire the subtitle data via the decoder. The video data and the subtitle data may be synchronized and displayed by the receiver. Synchronization between the video data and the subtitle data may be performed based on PTS information or media time information. A method of receiving a broadcast signal including an XML subtitle according to an embodiment of the present invention has been described above in detail with reference to FIG. 19.

Figure 24:
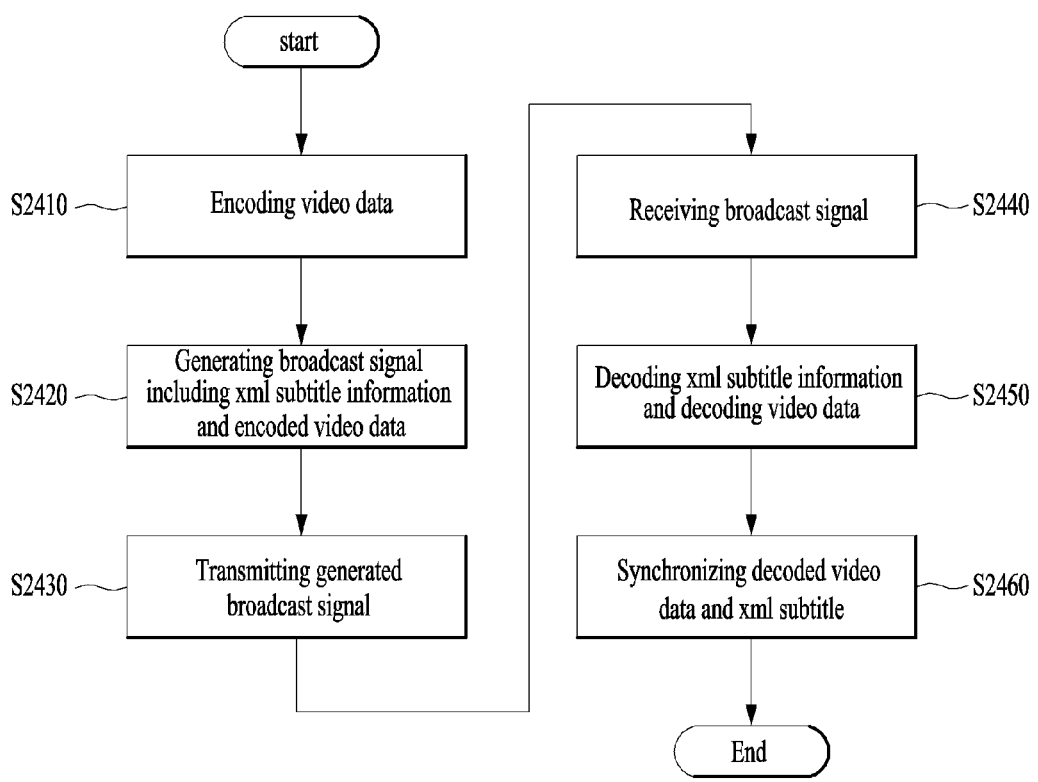
FIG. 24 is a diagram illustrating a method of transmitting and receiving a broadcast signal including XML subtitles according to an embodiment of the present invention.

FIG. 24 is a diagram illustrating a method of transmitting and receiving a broadcast signal including XML subtitles according to an embodiment of the present invention. The method of transmitting and receiving the broadcast signal including the XML subtitle may include encoding video data (S2410), generating a broadcast signal including the XML subtitle information and the encoded video data (S2420), transmitting the generated broadcast signal (S2430), receiving the broadcast signal (S2440), decoding the XML, subtitle stream and decoding the video stream (S2450), and synchronizing the decoded video data and XML subtitle (S2460).

In the encoding video data (S2410), video data with resolution of UHD, HD, or SD may be received and the video data may be encoded to generate a video stream. Here, the video stream may be encoded via High Efficiency Video Coding (HEVC). The video stream may refer to a video elementary stream (ES) or a video packetized elementary stream (PES) formed by packetizing a video ES. Simultaneously, the XML subtitle stream may be generated. A method of configuring the XML subtitle stream has been described above with reference to FIGS. 2 to 5. That is, scenario 1 as a method of using the same ES to transmit a head and a body of XML subtitle data has been described above with reference to FIG. 2 and scenario 1 as a method of dividing subtitle data and transmitting in each ES according to presentation time has been described above with reference to FIG. 3. In addition, scenario 2 as a method of separating and transmitting a head and a body of XML subtitle data has been described above with reference to FIG. 4 and scenario 2 as a method of separating a body of subtitle data according to presentation time has been described above with reference to FIG. 5. A procedure of packetizing the XML subtitle ES into a PES and related information has been described above with reference to FIGS. 8 to 12.

In the generating a broadcast signal including the XML subtitle information and the encoded video data (S2420), the encoded video stream and subtitle stream may be multiplexed to generate a transport stream (TS). Here, the subtitle stream may be an XML subtitle stream. A procedure of generating the TS including a subtitle stream has been described with reference to FIGS. 6 and 7. As described above, the video stream and the XML subtitle stream may be synchronized using the PTS information. The PTS of the XML subtitle stream may be set to have the same meaning as begin of content of the XML subtitle as described with reference to FIG. 8.

In the transmitting the generated broadcast signal (S2430), the transport stream may be transmitted as a broadcast signal. Here, the transport stream may be channel-coded and modulated before being transmitted and then may be transmitted as a broadcast signal.

In the receiving the broadcast signal (S2440), the broadcast signal may be received using a receiver (tuner). The received broadcast signal may be demodulated, decoded and then demultiplexed. The broadcast signal may be demultiplexed to the video stream and the subtitle stream.

In the decoding the XML subtitle stream and decoding the video stream (S2450), the video stream and the subtitle stream acquired via demultiplexing may be decoded. The video stream may be decoded into video data via a video decoder. In the operation, the subtitle stream may be decoded into subtitle data via a subtitle decoder. A method of decoding a subtitle stream has been described above for each scenario with reference to FIGS. 20 and 21.

In the synchronizing the decoded video data and XML subtitle (S2460), synchronization between video data and subtitle data may be performed based on PTS information or media time information. The video data and the subtitle data may be synchronized and displayed by a receiver. A method of synchronizing the decoded video data and an XML subtitle has been described above for each scenario with reference to FIGS. 20 and 21.

According to an embodiment of the present invention, MPEG2-TS for providing a digital broadcast subtitle service using an XML subtitle (TTML, SMPTE-TT, EBU-TT-D, etc.) may be transmitted.

According to an embodiment of the present invention, MPEG2-TS including an XML-based subtitle service may be received, processed, and output.

According to an embodiment of the present invention, an XML-based subtitle service may be provided from a broadcast network.

According to an embodiment of the present invention, an XML-based subtitle service may be synchronized with a video audio stream.

According to an embodiment of the present invention, a subtitle prepared based on XML may be divided and transmitted so as to enhance transmission efficiency of a terrestrial broadcast service.

According to an embodiment of the present invention, an apparatus for receiving an XML broadcast subtitle may extract and display an XML-based subtitle received in a terrestrial broadcast service.

According to an embodiment of the present invention, an XML subtitle service for an IP stream may be applied to broadcast. In detail, in terms of service provision, it may be possible to apply the XML subtitle service to a hybrid broadcasting service as well as media, an IP stream, and a broadcast service based on one subtitle source, and in terms of image quality, future expandability may be ensured in that all images with various sizes can be supported.

While the embodiments have been described with reference to respective drawings for convenience, embodiments may be combined to implement a new embodiment. In addition, designing computer-readable recording media storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The image processing methods proposed by the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, not by the above description, and all changes coming within the meaning and equivalency range of the appended claims are intended to be embraced therein.

In the specification, both the apparatus invention and the method invention are mentioned and description of both the apparatus invention and the method invention can be applied complementarily.

MODE FOR INVENTION

Various embodiments have been described in the best mode for carrying out the invention.

INDUSTRIAL APPLICABILITY

The present invention can be used and repeatedly implemented in broadcast and video signal processing fields.

The invention claimed is:

1. A method of transmitting a signal, the method comprising:
    encoding video data to generate a video stream;
    generating a subtitle stream including a subtitle segment base on XML (Extensible Markup Language),
    wherein the subtitle segment includes first synchronization information for synchronization;
    generating a PES (Packetized Elementary Stream) packet including the subtitle segment,
    wherein a header of the PES packet includes second synchronization information for synchronization;
    generating a signal comprising the generated video stream and the PES packet; and
    transmitting the generated signal,
    wherein start timing information indicated by the first synchronization information coincides with timing information indicated by the second synchronization information.

2. The method according to claim 1, wherein head and body elements for configuration of the subtitle segment are transmitted in one subtitle stream.

3. The method according to claim 1, wherein head and body elements for configuration of the subtitle segment are separated and transmitted in respective separate subtitle streams.

4. The method according to claim 1, wherein the subtitle segment is divided and transmitted in each respective subtitle stream according to presentation time of a subtitle.

5. The method according to claim 1, wherein a type of the subtitle segment is one of Time Text Markup Language (TTML), Society of Motion Picture and Television Engineers Timed Text (SMPTE-TT), European Broadcasting Union Time Text (EBU-TT-D), European Broadcasting Union Time Text (EBU-TT), Common File Format & Media Formats Time Text (CFF-TT), and YouView.

6. The method according to claim 1, wherein the second synchronization information is PTS (Presentation Time Stamp), and
    wherein the video stream and the subtitle stream are synchronized based on the PTS.

7. A signal transmitter comprising:
    an encoder configured to encode video data to generate a video stream;
    a subtitle generator configured to generate a subtitle stream including a subtitle segment base on XML (Extensible Markup Language), and a PES (Packetized Elementary Stream) packet including the subtitle segment,
    wherein the subtitle segment includes first synchronization information for synchronization, and
    wherein a header of the PES packet includes second synchronization information for synchronization;
    a signal generator configured to generate a signal including the video stream and the PES packet; and
    a transmitter configured to transmit the generated signal,
    wherein start timing information indicated by the first synchronization information coincides with timing information indicated by the second synchronization information.

8. The broadcast signal transmitter according to claim 7, wherein head and body elements for configuration of the subtitle segment are transmitted in one subtitle stream.

9. The signal transmitter according to claim 7, wherein head and body elements for configuration of the subtitle segment are separated and transmitted in respective separate subtitle streams.

10. The signal transmitter according to claim 7, wherein the subtitle segment is divided and transmitted in each respective subtitle stream according to presentation time of a subtitle.

11. The signal transmitter according to claim 7, wherein a type of the subtitle segment is one of Time Text Markup Language (TTML), Society of Motion Picture and Television Engineers Timed Text (SMPTE-TT), European Broadcasting Union Time Text (EBU-TT-D), European Broadcasting Union Time Text (EBU-TT), Common File Format & Media Formats Time Text (CFF-TT), and YouView.

12. The signal transmitter according to claim 7, wherein the second synchronization information is PTS (Presentation Time Stamp), and
    wherein the video stream and the subtitle stream are synchronized based on the PTS.

13. A method receiving a broadcast signal, the method comprising:
    receiving a signal including a video stream, and a PES (Packetized Elementary Stream) packet including a subtitle stream,
    wherein the subtitle stream including a subtitle segment base on XML (Extensible Markup Language),
    wherein the subtitle segment includes first synchronization information for synchronization, and
    wherein a header of the PES packet includes second synchronization information for synchronization; and
    decoding each of the video stream and the subtitle stream,
    wherein start timing information indicated by the first synchronization information coincides with timing information indicated by the second synchronization information.

14. A signal receiver comprising:
    a receiver configured to receive a including a video stream, and a PES (Packetized Elementary Stream) packet including a subtitle stream,
    wherein the subtitle stream including a subtitle segment base on XML (Extensible Markup Language),
    wherein the subtitle segment includes first synchronization information for synchronization, and
    wherein a header of the PES packet includes second synchronization information for synchronization; and
    a decoder configured to decode each of the video stream and the subtitle stream,
    wherein start timing information indicated by the first synchronization information coincides with timing information indicated by the second synchronization information.

* * * * *